United States Patent
Ha et al.

(10) Patent No.: US 10,452,063 B2
(45) Date of Patent: Oct. 22, 2019

(54) METHOD, STORAGE MEDIUM, AND ELECTRONIC DEVICE FOR CONTROLLING UNMANNED AERIAL VEHICLE

(71) Applicant: Samsung Electronics Co., Ltd., Gyeonggi-do (KR)

(72) Inventors: Tae-Eun Ha, Gyeonggi-do (KR); Chang-Sik Kim, Gyeonggi-do (KR); Han-Bit Kim, Gyeonggi-do (KR); In-Hyuk Choi, Seoul (KR); Jae-Woo Choi, Gyeonggi-do (KR); Youn-Lea Kim, Seoul (KR); Ha-Sik Moon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 104 days.

(21) Appl. No.: 15/605,056

(22) Filed: May 25, 2017

(65) Prior Publication Data
US 2018/0024546 A1 Jan. 25, 2018

(30) Foreign Application Priority Data
Jul. 22, 2016 (KR) .......................... 10-2016-0093725

(51) Int. Cl.
*G05D 1/00* (2006.01)
*G06F 7/00* (2006.01)
*B64C 39/02* (2006.01)

(52) U.S. Cl.
CPC ......... *G05D 1/0016* (2013.01); *B64C 39/024* (2013.01); *G05D 1/0033* (2013.01); *B64C 2201/146* (2013.01)

(58) Field of Classification Search
None
See application file for complete search history.

(56) References Cited

U.S. PATENT DOCUMENTS 7,931,239 B2 * 4/2011 Pedersen .................. B60V 1/06
244/189
8,214,088 B2 7/2012 Lefebure
(Continued)

FOREIGN PATENT DOCUMENTS

| CN | 104820432 A | 8/2015 |
| CN | 205263538 U | 5/2016 |

(Continued)

OTHER PUBLICATIONS

International Search Report dated Aug. 17, 2017.
European Search Report dated Mar. 22, 2019.

*Primary Examiner* — Bhavesh V Amin
(74) *Attorney, Agent, or Firm* — Cha & Reiter, LLC.

(57) ABSTRACT

According to various embodiments, an electronic device for controlling a movement of an unmanned aerial vehicle, the electronic device comprising: a display that displays information associated with the movement of the unmanned aerial vehicle; a user interface disposed to be rotatable around the display and configured to detect an input; at least one processor configured to generate a control signal to control the movement of the unmanned aerial vehicle based on an input through at least one of the display and the user interface; and a communication interface that is configured to transmit the control signal to the unmanned aerial vehicle.

20 Claims, 26 Drawing Sheets

(56) References Cited

U.S. PATENT DOCUMENTS

| | | | |
|---|---|---|---|
| 8,325,065 B2 | 12/2012 | Maris | |
| 8,473,125 B2* | 6/2013 | Rischmuller | A63H 27/12 244/17.13 |
| 8,521,339 B2* | 8/2013 | Gariepy | B64C 39/024 244/190 |
| 8,564,547 B2* | 10/2013 | Amireh | G06F 3/044 178/18.01 |
| 8,577,535 B2 | 11/2013 | Cummings et al. | |
| 8,761,961 B2* | 6/2014 | Lee | G05D 1/0016 244/175 |
| 8,903,568 B1* | 12/2014 | Wang | G05D 1/0016 701/2 |
| 9,004,973 B2* | 4/2015 | Condon | A63H 13/00 446/37 |
| 9,268,336 B2* | 2/2016 | Erhart | A63H 30/04 |
| 9,690,289 B2* | 6/2017 | Yang | G05D 1/0016 |
| 9,927,812 B2* | 3/2018 | Wang | G05D 1/0016 |
| 2009/0284553 A1* | 11/2009 | Seydoux | A63F 13/10 345/649 |
| 2010/0009735 A1* | 1/2010 | Seydoux | A63F 13/00 463/6 |
| 2011/0221692 A1* | 9/2011 | Seydoux | A63H 27/12 345/173 |
| 2011/0288696 A1* | 11/2011 | Lefebure | A63H 27/12 701/2 |
| 2011/0299732 A1* | 12/2011 | Jonchery | A63H 27/12 382/103 |
| 2011/0301783 A1* | 12/2011 | Goossen | G05D 1/0016 701/2 |
| 2011/0311099 A1* | 12/2011 | Derbanne | G06T 7/207 382/103 |
| 2012/0015686 A1* | 1/2012 | Krupnik | A63H 30/04 455/550.1 |
| 2012/0016534 A1 | 1/2012 | Lee et al. | |
| 2012/0029731 A1* | 2/2012 | Waldock | G05D 1/0044 701/2 |
| 2012/0232718 A1* | 9/2012 | Rischmuller | A63H 27/12 701/2 |
| 2013/0109272 A1* | 5/2013 | Rindlisbacher | A63H 30/04 446/454 |
| 2013/0127980 A1* | 5/2013 | Haddick | G06F 3/013 348/14.08 |
| 2013/0173088 A1* | 7/2013 | Callou | B64C 39/024 701/2 |
| 2013/0176423 A1* | 7/2013 | Rischmuller | G05D 1/0038 348/114 |
| 2013/0293362 A1* | 11/2013 | Parazynski | G08C 19/16 340/12.52 |
| 2014/0008496 A1* | 1/2014 | Ye | B64C 13/20 244/190 |
| 2014/0142784 A1* | 5/2014 | Muren | G05D 1/0016 701/2 |
| 2014/0371954 A1* | 12/2014 | Lee | G08C 17/02 701/2 |
| 2015/0142213 A1* | 5/2015 | Wang | G05D 1/0016 701/2 |
| 2015/0202540 A1* | 7/2015 | Erhart | A63H 30/04 340/12.5 |
| 2015/0249976 A1* | 9/2015 | Melzer | H04W 4/21 370/329 |
| 2016/0026308 A1* | 1/2016 | Wu | G06F 3/04883 345/173 |
| 2016/0139595 A1* | 5/2016 | Yang | G05D 1/0016 701/2 |
| 2017/0185259 A1 | 6/2017 | Chen | |
| 2017/0199521 A1* | 7/2017 | Tang | A63H 30/04 |

FOREIGN PATENT DOCUMENTS

| | | |
|---|---|---|
| CN | 105630341 A | 6/2016 |
| KR | 10-2015-0069856 A | 6/2015 |
| KR | 10-2016-0058471 A | 5/2016 |

* cited by examiner

METHOD, STORAGE MEDIUM, AND ELECTRONIC DEVICE FOR CONTROLLING UNMANNED AERIAL VEHICLE

CLAIM OF PRIORITY

This application claims the priority under 35 U.S.C. § 119(a) to Korean Application Serial No. 10-2016-0093725, which was filed in the Korean Intellectual Property Office on Jul. 22, 2016, the entire content of which is hereby incorporated by reference.

TECHNICAL FIELD

The present disclosure relates to an electronic device, a method, and a storage medium for controlling an unmanned aerial vehicle commonly referred to as "drones."

BACKGROUND

Generally, an unmanned aerial vehicle may refer to an aircraft that flies by the induction of radio waves without a human pilot aboard, or autonomously flies according to a previously input program or by recognizing and determining surroundings (obstacles and courses) with autonomy. An unmanned aerial vehicle may be used for military purposes, such as surveillance, reconnaissance, precision weapon guidance, and communication/information relay, and use thereof is expanding to civilian applications, such as disaster and accident prevention, monitoring of geographical and environmental changes, research and development, imaging, distribution, and communication. Further, with the commercialization of not only unmanned aerial vehicles for commercial purposes but also helicopter-shaped recreational unmanned aerial vehicles including a plurality of rotors or propellers, unmanned aerial vehicles are used for diverse applications.

SUMMARY

As unmanned aerial vehicles are used for diverse applications, various methods are introduced to control unmanned aerial vehicles. For example, a left controller of a remote controller is used to perform yaw and throttle controls, and a right controller is used to perform roll and pitch controls. However, since this remote controller is different in its movement and manipulation system from an actual unmanned aerial vehicle, a user requires considerable skill. According to a control method using a change in the position of a controller, an unmanned aerial vehicle is moved according to an inclined direction of the controller, while it is necessary to turn this very controller when performing a yaw control with a motion, which does not allow a user to see the control screen, making it difficult to perform an intuitive control.

Various embodiments of the present disclosure are to provide an electronic device and a control method thereof that enable intuitive controls of not only a roll and a pitch of an unmanned aerial vehicle but also a yaw and a throttle of the unmanned aerial vehicle by using a rotatable structure mounted in the electronic device.

According to various embodiments, an electronic device for controlling a movement of an unmanned aerial vehicle may include: a display that displays information associated with the movement of the unmanned aerial vehicle; a user interface disposed to be rotatable around the display and is configured to detect an input; at least one processor that is configured to generate a control signal to control the movement of the unmanned aerial vehicle based on an input through at least one of the display and the user interface; and a communication interface that is configured to transmit the control signal to the unmanned aerial vehicle.

According to various embodiments, a storage medium stores instructions, wherein the instructions are set for at least one processor to perform at least one operation when executed by the at least one processor, and the at least one operation may include: displaying information associated with a movement of an unmanned aerial vehicle; generating a control signal to control the movement of the unmanned aerial vehicle based on an input through at least one of a user interface and a display, wherein the user interface is disposed to be rotatable around a display of an electronic device displaying the information and is configured to perform detecting an input to move the unmanned aerial vehicle; and transmitting the control signal to the unmanned aerial vehicle.

According to various embodiments, a method of controlling a movement of an unmanned aerial vehicle by an electronic device may include: displaying information associated with the movement of the unmanned aerial vehicle; generating a control signal to control the movement of the unmanned aerial vehicle based on an input through at least one of a user interface, which is disposed to be rotatable around a display of the electronic device displaying the information and is configured to perform detecting an input to move the unmanned aerial vehicle, and the display; and transmitting the control signal to the unmanned aerial vehicle.

According to various embodiments, by using a rotatable structure mounted in an electronic device, it is possible to intuitively control not only a roll and a pitch of an unmanned aerial vehicle but also a yaw and a throttle of the unmanned aerial vehicle.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
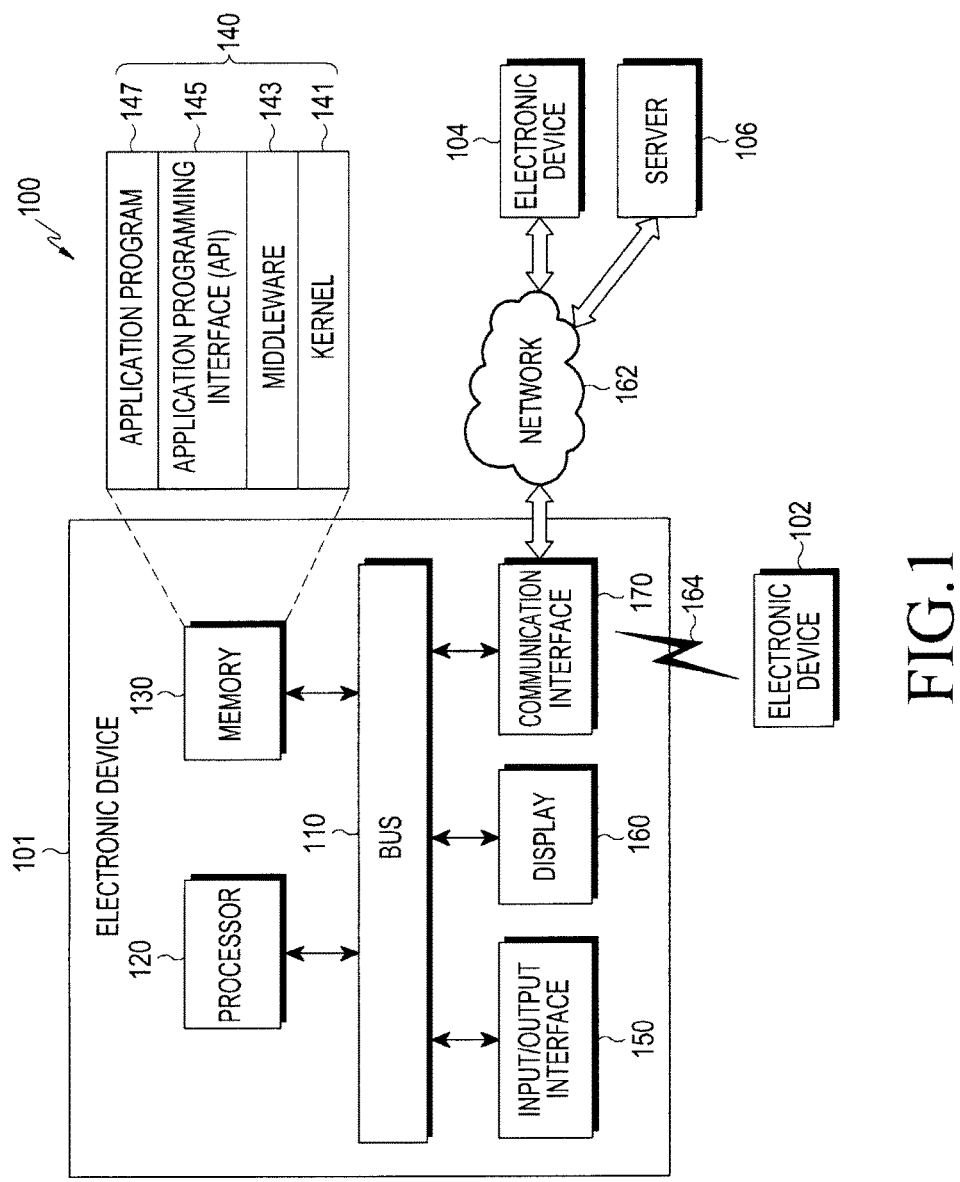
FIG. 1 illustrates a network environment including an electronic device according to various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In the description of the drawings, similar reference numerals may be used to designate similar elements. A singular expression may include a plural expression unless they are definitely different in a context. In the present disclosure, the expression "A or B", "at least one of A and/or B", or "A/B" may include all possible combinations of the items listed. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 in a network environment 100 according to various embodiments is described with reference to FIG. 1. The electronic device 101 may include a bus 110, a processor 120, a memory 130, an input/output interface 150, a display 160, and a communication interface 170. In some embodiments, at least one of the components may be omitted or an additional component may be further included in the electronic device 101.

The bus 110 may include a circuit that connects the components 110 to 170 to each other and delivers communications (for example, control messages or data) between the components.

The processor 120 may include one or more of a central processing unit, an application processor, and a communication processor (CP). The processor 120 may control, for example, at least one different component of the electronic device 101 and/or may perform an operation relating to communication or data processing.

The memory 130 may include a volatile and/or nonvolatile memory. The memory 130 may store, for example, a command or data related to at least one different component of the electronic device 101.

According to one embodiment, the memory 130 may store software and/or a program 140. The program 140 may include, for example, a kernel 141, middleware 143, an application programming interface (API) 145, and/or an application program (or "application") 147. At least part of the kernel 141, the middleware 143, and the API 145 may be designated as an operating system.

The kernel 141 may control or manage system resources (for example, the bus 110, the processor 120, the memory 130, or the like) used to perform an operation or function implemented in other programs (for example, the middleware 143, the API 145, or the application program 147). Further, the kernel 141 may provide an interface that allows the middleware 143, the API 145, or the application program 147 to access an individual component of the electronic device 101 to thereby control or manage the system resources.

The middleware 143 may serve as a relay so that, for example, the API 145 or the application program 147 communicates with the kernel 141 to exchange data. Further, the middleware 143 may process one or more requests for operations received from the application program 147 according to priority. For example, the middleware 143 may assign at least one application program 147 a priority for using a system resource (for example, the bus 110, the processor 120, the memory 130, or the like) of the electronic device 101 and may process the one or more requests for operations. The API 145 is an interface for the application 147 to control a function provided from the kernel 141 or the middleware 143 and may include, for example, at least one interface or function (for example, a command) for file control, window control, image processing, or text control. The input/output interface 150 may deliver a command or data, which is input from, for example, a user or different external device, to a different component(s) of the electronic device 101 or may output a command or data, which is received from a different component(s) of the electronic device 101, to the user or different external device.

In one embodiment, the memory 140 can store a command set for controlling an unmanned aerial vehicle. When the unmanned aerial vehicle receives a particular one of the command set, the unmanned aerial vehicle performs the command. The command set can include, for example, and not limited to, take off, move up, move down, move left, move right, move forward, move backwards, and rotate. In certain embodiments, each of the foregoing commands can include an incremented amount and the movement by a certain amount is achieved by repeated selection of the corresponding movement command until the sum of the increments is the certain amount. Alternatively, the processor can select the command, and set a field in the command indicating the amount.

As used herein, "generate a command" or "generate a control signal" by a processor shall be understood to transmit the command to the UAV using the communication interface. It shall be understood that "generate a command", or "generate a control signal" shall include selecting a command from a command set.

As used herein "select a command from a command set" to move the UAV by a particular amount, shall be understood to include a processor repeatedly selecting a command to move the UAV by an increment until the sum of the increments is equal to a particular amount or selection of a command from the command set, and setting of a field in the command with the particular amount, and transmitting the command to the UAV.

Moreover, each of the commands can be preformatted according to a predetermined protocol or standard known to the unmanned aerial vehicle. The predetermined protocol can include, but is not limited to Mavlink, Mavlink2, DroneKit, nav_msgs. In certain embodiments, the commands can be formatted as data packets with a header and the command in the payload of the data packet.

The display 160 may include, for example, a liquid crystal display (LCD), a light emitting diode (LED) display, an organic light emitting diode (OLED) display, a microelectromechanical systems (MEMS) display, and an electronic paper display. The display 160 may display, for example, various types of content (for example, a text, an image, a video, an icon, and/or a symbol) for the user. The display 160 may include a touch screen and may receive touch, gesture, proximity, or hovering inputs using, for example, an electronic pen or a user body part.

The communication interface 170 may establish communication, for example, between the electronic device 101 and an external device (for example, a first external electronic device 102, a second external electronic device 104, or a server 106). For example, the communication interface 170 may be connected to a network 162 via wireless communication or wire-based communication to communicate with the external device (for example, the second external electronic device 104 or the server 106).

The wireless communication may include cellular communication using, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). According to one embodiment, the wireless communication may include, for example, at least one of Wireless Fidelity (Wi-Fi), Bluetooth, Bluetooth Low Energy (BLE), Zigbee, Near Field Communication (NFC), Magnetic Secure Transmission, Radio Frequency (RF), and Body Area Network (BAN). According to one embodiment, the wireless communication may include Global Navigation Satellite System (GNSS). The GNSS may be, for example, a Global Positioning System (GPS), a global navigation satellite system (Glonass), a Beidou navigation satellite system (hereinafter, "Beidou"), or Galileo, which is the European global satellite-based navigation system. In the present document, "GPS" may be interchangeably used with "GNSS" hereinafter. The wire-based communication may include, for example, at least one of Universal Serial Bus (USB), High Definition Multimedia Interface (HDMI), Recommended Standard 232 (RS-232), Power Line Communication, and Plain Old Telephone Service (POTS). The network 162 may include a telecommunications network, for example, at least one of a computer network (for example, a Local Area Network (LAN) or Wide Area Network (WAN)), the Internet, and a telephone network.

The first and second external electronic devices 102 and 104 may each be a device of a type that is the same as, or different from, the electronic device 101.

According to various embodiments, all or part of the operations performed in the electronic device 101 may be performed in another electronic device or a plurality of electronic devices (for example, the electronic devices 102 and 104 or the server 106).

According to one embodiment, when the electronic device 101 needs to perform a function or service automatically or by request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional function and may transmit the result to the electronic device 101. The electronic device 101 may provide the requested function or service by using the same received result or by additionally processing the result. To this end, cloud computing, distributed computing, or client-server computing technologies may be used.

In various embodiments of the present disclosure, the processor 120 may control the display 160 to display information associated with a movement of an Unmanned Aerial Vehicle (UAV) in a display area corresponding to a state of the UAV and a user input.

In various embodiments of the present disclosure, the processor 120 may be configured to generate a control signal or select a command from the command set stored in the memory 140 to control the movement of the UAV based on a touch input through the display 160 or an input through at least one user interface disposed to be rotatable around the display 160, with the information associated with the movement of the UAV being displayed. The control signal may be transmitted to the UAV through the communication interface 170.

In various embodiments of the present disclosure, the user interface has a rotatable structure so that the user may rotate the user interface. The user interface (not shown) will be described below in detail.

In various embodiments of the present disclosure, when the electronic device 101 is a wearable device, for example, a smart watch, the display 160 is installed on a front surface of the electronic device 101, and the user interface may also be installed on the front surface along with the display 160. The electronic device 101 may further include a main body including a rear surface that is in contact with a body part of the user wearing the electronic device 101 and a band (or strap) connected to opposite ends of the main body to fix the electronic device 101 on the wrist of the user.

In various embodiments of the present disclosure, the processor 120 may be configured to display a screen that displays information on the flight of the UAV in the display area of the display 160, and to generate a control signal or select a command from the command set stored in the memory 140 to control the flight of the UAV corresponding to a touch when the touch is detected in one area among divided upper and lower areas of the display area and a central area positioned on a shared boundary between the divided upper and lower areas. When the user touches one spot on the display 160, a touch sensor (not shown) may detect the spot touched by the user.

In various embodiments of the present disclosure, when a touch and drag input, which is a touch input starting from the central area and moving to another area, is detected, the processor 120 may generate a control signal or select a command from the command set stored in memory 140 for roll and pitch controls of the UAV corresponding to the direction of the touch and drag. Accordingly, when the user touches and drags the central area, the processor 120 may be configured to generate a control signal or select a command from the command set stored in memory 140 to adjust the flight of the UAV in any one of a left-and-right direction and a forward-and-backward direction corresponding to the direction of the drag and to transmit the control signal to the UAV.

In various embodiments of the present disclosure, when a touch and drag input, which is a touch input starting from any one of the divided upper and lower areas of the display area excluding the central area and moving to the other area, is detected, the processor 120 may generate a control signal or select a command from the command set stored in memory 140 for a throttle control of the UAV corresponding to the direction of the touch and drag. For example, when the user inputs a touch and drag from the upper area to the lower area on the display 160, the processor 120 may be configured to generate a control signal or select a command from the command set stored in memory 140 to decrease the altitude of the UAV and to transmit the control signal to the UAV.

In various embodiments of the present disclosure, when the user interface is formed to have a ring structure that is formed along the circumference of the display 160 and is physically rotatable, the processor 120 may be configured to generate a control signal or select a command from the command set stored in memory 140 to adjust the rotation of the UAV corresponding to a rotational movement by the rotation of the ring structure.

In various embodiments of the present disclosure, the processor 120 may be configured to generate a control signal or select a command from the command set stored in memory 140 to control the rotation or altitude of the UAV corresponding to the rotation of the user interface according to whether the electronic device 101 is in a horizontal state of being parallel, substantially parallel or within 10 degrees of parallel, with a first reference surface or the electronic device 101 is in a vertical state of being orthogonal, substantially orthogonal, or within 10 degrees of orthogonal to the first reference surface. The first reference surface can be, for example, the ground.

Figure 2:
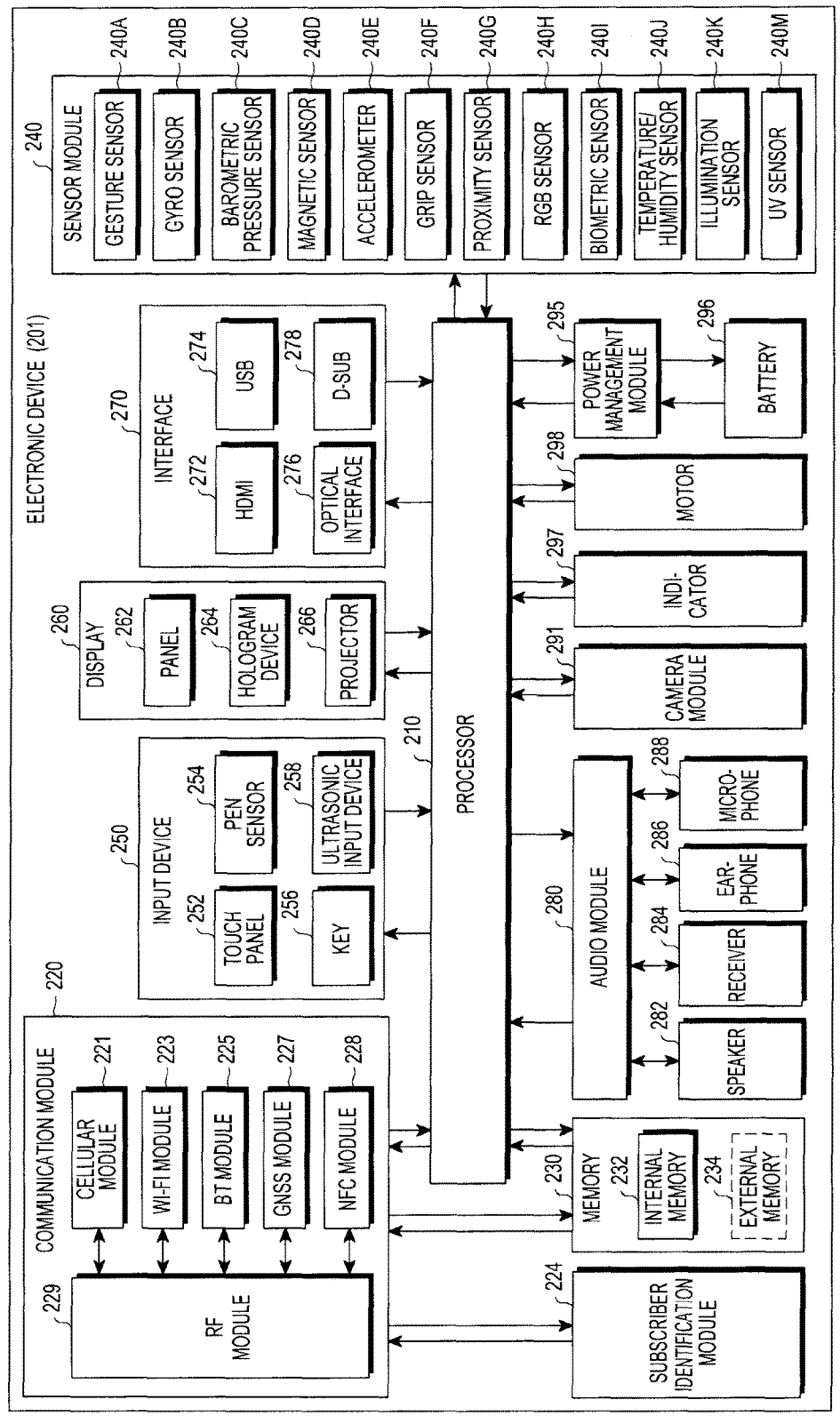
FIG. 2 is a block diagram of an electronic device according to various embodiments of the present disclosure.

FIG. 2 is a block diagram of an electronic device 201 according to various embodiments. The electronic device 201 may include, for example, the whole or part of the electronic device 101 illustrated in FIG. 1. The electronic device 201 may include one or more processors (for example, APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processors 210 may run, for example, an OS or an application program to control a plurality of hardware or software components that are connected to the processors 210 and may perform various kinds of data processing and operations. The processors 210 may be configured, for example, as a system on chip (SoC).

According to one embodiment, the processors 210 may further include a graphic processing unit (GPU) and/or an image signal processor. The processors 210 may include at least part (for example, a cellular module 221) of the components illustrated in FIG. 2. The processors 210 may load a command or data received from at least one of the other components (for example, a nonvolatile memory) into a volatile memory to process the command or data and may store the resulting data in the nonvolatile memory.

The communication module 220 may have a configuration that is the same as, or similar to, that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text messaging service, or an Internet service through a communication network. According to one embodiment, the cellular module 221 may perform identification and authentication of the electronic device 201 in a communication network using the SIM (for example, an SIM card) 224. According to one embodiment, the cellular module 221 may perform at least part of the functions provided by the processors 210. According to one embodiment, the cellular module 221 may include a communication processor (CP). According to one embodiment, at least part (for example, two or more) of the cellular module 221, the Wi-Fi module 223, the Bluetooth module 225, the GNSS module 227, and the NFC module 228 may be included in one integrated chip (IC) or IC package. The RF module 229 may transmit and receive, for example, a communication signal (for example, an RF signal). The RF module 229 may include, for example, a transceiver, a power amplifier (amp) module (PAM), a frequency filter, a low noise amplifier (LNA), at least one antenna, or the like. According to another embodiment, at least one of the cellular module 221, the Wi-Fi module 223, the Bluetooth module 225, the GNSS module 227, and the NFC module 228 may transmit and receive an RF signal through a separate RF module. The SIM 224 may include, for example, a card including an SIM or an embedded SIM and may include unique identification information (for example, an Integrated Circuit Card Identifier (ICCID)) or subscriber information (for example, an International Mobile Subscriber Identity (IMSI)).

According to one embodiment, the Wi-Fi module 223 may establish a Wi-Fi Peer-to-Peer connection to a UAV pursuant to the Wi-Fi Direct, promulgated by the Wi-Fi Alliance.

The memory 230 (for example, a memory 130) may include, for example, an internal memory 232 or an external memory 234. The internal memory 232 may include, for example, at least one of a volatile memory (for example, a Dynamic Random-Access Memory (DRAM), a Static RAM (SRAM), a Synchronous Dynamic RAM (SDRAM), or the like) and a nonvolatile memory (for example, a One-Time Programmable Read-Only Memory (OTPROM), a Programmable ROM (PROM), an Erasable And Programmable ROM (EPROM), an Electrically Erasable Programmable ROM (EEPROM), a mask ROM, a flash ROM, a flash memory, a hard drive, or a Solid State Drive (SSD)). The external memory 234 may include a flash drive, for example, a Compact Flash (CF), a Secure Digital (SD), a Micro-SD, a Mini-SD, an extreme digital (xD), a Multi-Media Card (MMC), a memory stick, or the like. The external memory 234 may be functionally or physically connected to the electronic device 201 through various interfaces.

The sensor module 240 may measure, for example, physical quantities or may detect an operation state of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor configured, as a part of the processors 210 or separately from the processors 210, to control the sensor module 240, thereby controlling the sensor module 240 while the processors 210 are in a sleep state.

The input device 250 may include, for example, a touch panel 252, a (digital) pen sensor 254, a key 256, or an ultrasonic input device 258. The touch panel 252 may use, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response. The (digital) pen sensor 254 may, for example, be part of the touch panel or include a separate recognition sheet. The key 256 may include, for example, a physical button, an optical key, or a keypad. The ultrasonic input device 258 may detect ultrasonic waves generated in an input tool through a microphone (for example, a microphone 288) and may identify data corresponding to the detected ultrasonic waves.

The display 260 (for example, a display 160) may include a panel 262, a hologram device 264, a projector 266, and/or a control circuit to control the panel 262, the hologram device 264, and the projector 266. The panel 262 may be configured, for example, to be flexible, transparent, or wearable. The panel 262 may be formed with the touch panel 252 in one or more modules. According to one embodiment, the panel 262 may include a pressure sensor (or force sensor) to measure the strength of pressure caused by a user touch. The pressure sensor may be configured in an integrated form with the touch panel 252 or may be configured as one or more sensors separate from the touch panel 252. The hologram device 264 may display a three-dimensional image in the air using the interference of light. The projector 266 may project light onto a screen to display an image. The screen may be disposed, for example, inside or outside the electronic device 201. The interface 270 may include, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD card/MMC interface, or an Infrared Data Association (IrDA) interface.

The audio module 280 may convert, for example, a sound and an electrical signal reciprocally. At least some components of the audio module 280 may be included, for example, in an input/output interface 150 illustrated in FIG. 1. The audio module 280 may process sound information input or output, for example, through a speaker 282, a receiver 284, earphones 286, or the microphone 288.

The camera module 291 is a device that takes, for example, a still image and a video. According to one embodiment, the camera module 291 may include one or more image sensors (for example, a front sensor or a rear sensor), a lens, an image signal processor (ISP), or a flash (for example, an LED, a xenon lamp, or the like).

The power management module 295 may manage, for example, the power of the electronic device 201. According to one embodiment, the power management module 295 may include a power management integrated circuit (PMIC), a charger integrated circuit (IC), or a battery or fuel gauge. The PMIC may have wire-based and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 may display a specific state of the electronic device 201 or a component thereof (for example, the processors 210), for example, a booting state, a message state, or a charging state. The motor 298 may convert an electrical signal into mechanical vibrations and may generate vibrations or a haptic effect. The electronic device 201 may include a mobile TV supporting device (for example, a GPU) that is capable of processing media data in accordance with, for example, digital multimedia broadcasting (DMB), digital video broadcasting (DVB), or mediaFlo™ standards. Each of the above-described component elements of hardware according to the present disclosure may be configured with one or more components, and the names of the corresponding component elements may vary based on the type of electronic device. According to various embodiments, the electronic device (e.g., the electronic device 201) does not include some elements or further include additional elements. Some of elements are coupled to constitute one object but the electronic device may perform the same functions as those which the corresponding elements have before being coupled to each other.

In certain embodiments, the touch panel 252 can detect touch inputs and provide the touch inputs to the processor 210. Based on the touch inputs, the processor 210 can generate control commands or select a command from the command set stored in memory to be transmitted to the UAV via the communication module 220.

In certain embodiments, the gyro sensor 240B can detect orientation of the electronic device—a horizontal state, parallel, substantially parallel, or within 10 degrees of parallel to the ground, or a vertical state, orthogonal, substantially orthogonal, or within 10 degrees of orthogonal to the ground. Responsive thereto, the gyro sensor provides inputs to the processor 210 indicating the orientation. Based on the inputs from the gyro sensor 240B, the processor 210 can generate control commands or select a command from the command set stored in memory to be transmitted to the UAV via the communication module 220.

In certain embodiments, the accelerometer 240E can detect movement of the electronic device, such as movement in an upward or downward direction. Responsive thereto, the accelerometer 240E provides inputs to the processor 210 indicating the motion. Based on the inputs indicating motion, the processor 210 can generate control commands or select a command from the command set stored in memory to be transmitted to the UAV via the communication module 220.

Figure 3:
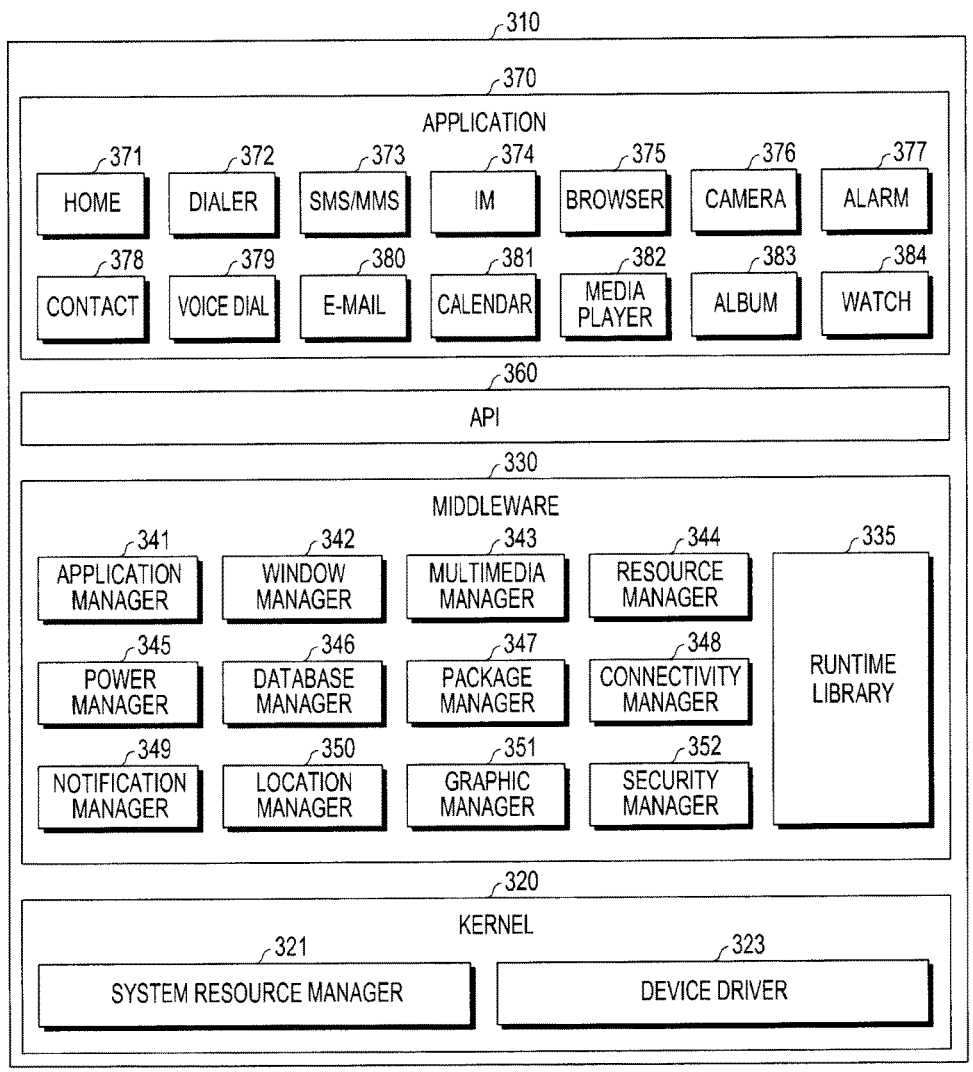
FIG. 3 is a block diagram of a program module according to various embodiments of the present disclosure.

FIG. 3 is a block diagram of a program module according to various embodiments. According to one embodiment, the program module 310 (for example, the program 140) may include an operating system that controls resources related to an electronic device (for example, the electronic device 101) and/or various applications (for example, the application program 147) that run on the operating system. The operating system may be, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or an application 370 (for example, the application program 147). At least part of the program module 310 may be preloaded onto the electronic device or may be downloaded from an external electronic device (for example, the electronic device 102 or 104, the server 106, or the like).

The kernel 320 may include, for example, a system resource manager 321 and/or a device driver 323. The system resource manager 321 may perform the control, allocation, or recovery of system resources. According to one embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication ((IPC) driver. The middleware 330 may provide, for example, a function commonly needed for an application 370 or may provide the application 370 with various functions through the API 360 so that the application 370 may use limited systems resources in the electronic device. According to one embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the application 370 is running. The runtime library 335 may perform input/output management, memory management, or arithmetic function processing. The application manager 341 may manage, for example, the life cycle of the application 370. The window manager 342 may manage graphic user interface (GUI) resources used for a screen. The multimedia manager 343 may identify formats necessary to play media files and may encode or decode a media file using a codec suitable for a corresponding format. The resource manager 344 may manage a source code of the application 370 or a memory space. The power manager 345 may manage, for example, a battery level or power and may provide power information necessary for an operation of the electronic device. According to one embodiment, the power manager 345 may interwork with a basic input/output system (BIOS). The database manager 346 may generate, retrieve, or change a database to be used, for example, for the application 370. The package manager 347 may install or update an application distributed in the form of a package file.

The connectivity manager 348 may manage, for example, wireless connectivity. The notification manager 349 may provide a user with, for example, an incoming message, an appointment, and an event including a proximity notification. The location manager 350 may manage, for example, location information on the electronic device. The graphic manager 351 may manage, for example, a graphic effect to be provided for the user or a user interface related to the graphic effect. The security manager 352 may provide, for example, system security or user authentication. According to one embodiment, the middleware 330 may include a telephony manager to manage a voice or video call function of the electronic device or a middleware module that is capable of forming combinations of functions of the foregoing components. According to one embodiment, the middleware 330 may provide a specialized module for each type of an operating system. The middleware 330 may dynamically delete some of the existing components or add new components. The API 360 is, for example, a set of API programming functions and may be provided with a different configuration depending on an OS. For example, one API set for each platform may be provided in Android or iOS, while two or more API sets for each platform may be provided in Tizen.

The application 370 may include, for example, a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, a watch 384, a health care application (for example, for measuring exercising or blood sugar), or an environmental data application (for example, for providing atmospheric pressure, humidity, or temperature data). According to one embodiment, the application 370 may include an information exchange application that supports information exchanges between the electronic device and an external electronic device. The information exchange application may include, for example, a notification relay application for relaying specific information to the external electronic device or a device management application for managing the external electronic device. For example, the notification relay application may relay notification information, which is generated in another application of the electronic device, to the external electronic device or may receive notification information from the external electronic device to provide the notification information to the user. The device management application may install, delete, or update, for example, a function (for example, a function of turning on/turning off the external electronic device itself (or some components) or adjusting the brightness (or resolution) of a display) of the external electronic device communicating with the electronic device or an application operating in the external electronic device. According to one embodiment, the application 370 may include an application (for example, a health care application of a mobile medical device) assigned according to an attribute of the external electronic device. According to one embodiment, the application 370 may include an application received from the external electronic device. At least part of the program module 310 may be implemented (for example, run) in software, firmware, hardware (for example, the processor 210), or combinations of at least two or more thereof and may include a module, a program, a routine, a set of instructions, or a process to perform one or more functions.

In certain embodiments, the application layer 370 can include an application providing an interface for controlling a UAV. Application providing the interface can further cause one or more processors to generate commands or select a command from a command set for controlling the UAV. The run-time library 335 can store the command set for controlling the UAV.

As used herein, the term "module" may refer to memory storing executable instructions, a hardware unit, or a combination of hardware and memory storing executable instructions, and may be used interchangeably with, for example, a logic, a logical block, a component, or a circuit. A module may be an integrated component, a minimum unit performing one or more functions, or a part thereof. The module may be implemented mechanically or electronically. For example, the module may include Application-Specific Integrated Circuit (ASIC) chips, Field-Programmable Gate Arrays (FPGAs), or Programmable Logic Devices that perform operations, which have already been known or will be developed in the future. At least part of the devices (for example, modules or functions thereof) or methods (for example, operations) according to various embodiments may be implemented as instructions stored in a computer-readable storage medium (for example, the memory 130) in the form of a programming module. When the instructions are executed by a processor (for example, the processor 120), the processor may perform functions corresponding to the instructions. The computer-readable storage medium may include a hard disk, a floppy disk, a magnetic medium (for example, a magnetic tape), an optical medium (for example, a CD-ROM and a DVD), a magneto-optical medium (for example, a floptical disk), an internal memory, or the like. The instructions may include a code created by a compiler or a code executable by an interpreter. A module or a program module according to various embodiments may include at least one or more of the aforementioned elements, may omit some of the elements, or may further include other elements. Operations performed by the module, the program module, or the other elements according to various embodiments may be carried out sequentially, in parallel, repeatedly, or heuristically; at least some operations may be carried out in a different order or may be omitted; or other operations may be added.

Hereinafter, prior to describing a method of controlling the flight of an unmanned aerial vehicle using an electronic device 101 according to various embodiments of the present disclosure, an Unmanned Aerial Vehicle (UAV) of the present disclosure is described as follows. A UAV refers to an aircraft, such as a quad-rotor, that is capable of vertically taking off and landing and is capable of making a movement, such as hovering, pitching, rolling, and yawing. Here, it should be noted that the method of controlling the UAV according to the various embodiments of the present disclosure may be variously applicable, without being limited to the quad-rotor. Although a quad-rotor is illustrated as an example of the UAV in FIGS. 8A and 8B, the UAV may be any UAV including one or more engines and/or one or more propellers. That is, the UAV may be any device that is capable of making a movement according to control by the electronic device 101, without being limited thereto.

Figure 4:
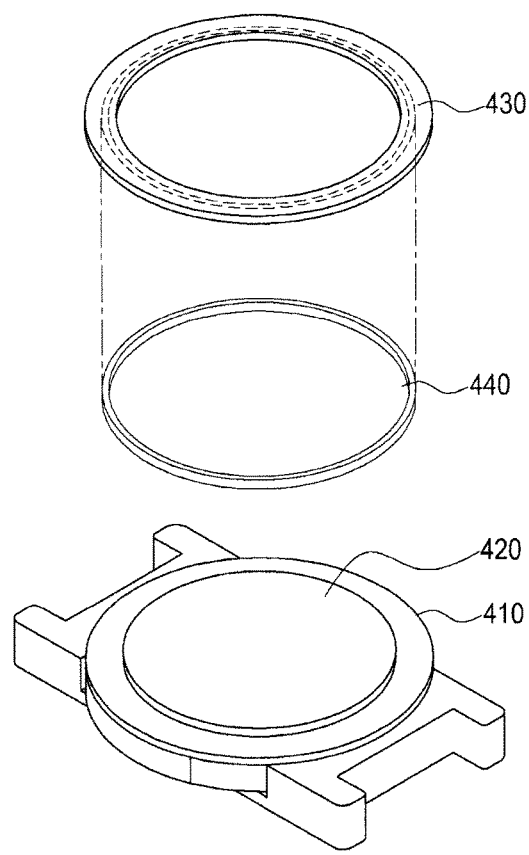
FIG. 4 is an exploded perspective view of an electronic device according to various embodiments of the present disclosure.

Meanwhile, the electronic device 101 according to various embodiments of the present disclosure is an electronic apparatus controlling the UAV, which may be, for example, not only an electronic device 101 held in a user's hand for use but also a wearable electronic device to be worn on the body part, specifically a watch-type wearable device to be worn on the user's body part to allow the user to readily manipulate the electronic device 101, without being limited thereto. FIG. 4 is an exploded perspective view of the electronic device 101 according to various embodiments of the present disclosure.

Referring to FIG. 4, the electronic device 101 according to one embodiment of the present disclosure may include a housing 410, a circular display 420, a ring structure 430 (or wheel dial member), and a settling structure 440 (or wheel dial fixing member).

The electronic device 101 according to the embodiment of the present disclosure may be described, for example, as a watch-type wearable electronic device 101. However, the electronic device 101 is not limited thereto but may include any electronic device (for example, a smartphone and a body-mounted electronic device) including the wheel dial member 430.

Referring to FIG. 4, when the wheel dial member 430 is rotated, a groove with protrusions formed on a lower surface of the wheel dial member 430 is also rotated. Accordingly, when an insertion member 440 with protrusions corresponding to the protrusions in the groove, is inserted into the groove formed on the lower surface of the wheel dial member 430, the user may feel a click sense by the rotation of the wheel dial member 430. The electronic device 101 provides the user with the click sense using the wheel dial member 430, thus allowing the user to recognize a rotational manipulation through a tactile sensation. Accordingly, the user is able to control the UAV, conveniently recognizing a rotational manipulation of the wheel dial member 430, such as rotation amount or rotation speed, without continuously checking whether a desired movement is achieved on a screen during the direct manipulation of the wheel dial member 430.

Figure 5:
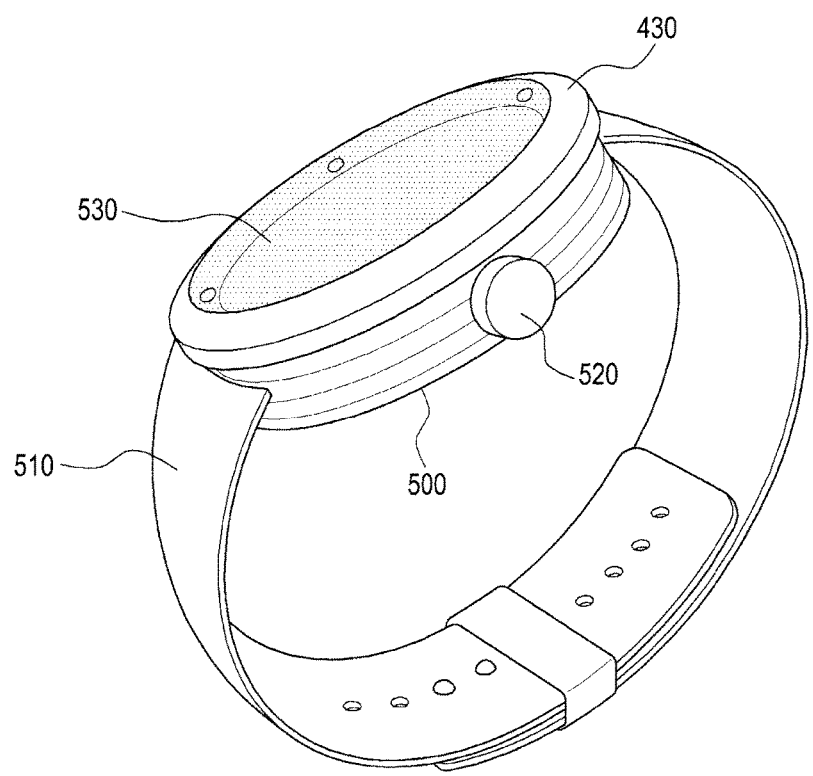
FIG. 5 schematically illustrates a watch-type electronic device with a wheel dial member mounted according to various embodiments of the present disclosure.

In certain embodiments, a sensor can detect rotational manipulation of the wheel dial member 430 and provide an input indicating an amount of rotation to a processor 210. Responsive thereto, the processor 210 can generate commands for rotating the UAV by a particular amount and/or speed, or select a command from a command set for rotating the UAV by the particular amount and/or speed. FIG. 5 schematically illustrates the watch-type electronic device 101 with a wheel dial member mounted according to various embodiments of the present disclosure.

As illustrated in FIG. 5, the electronic device 101 may include a main body 500 and a band 510 (or strap) for fixing the main body 500 on a user's wrist.

The main body 500 may include a wheel dial member 430, a watch stem 520, and a display 530. The wheel dial member 430 is a user interface that is disposed to be rotatable around the display 530 and is configured to detect an input to move a UAV. For example, a rotational movement of the UAV may be controlled according to the rotation or a rotation angle (or rotation amount) of the wheel dial member 430.

The watch stem 520 is fixed to one end of a watch-stem shaft and is capable of rotating about the watch-stem shaft and moving forward or backward according to a length direction of the watch-stem shaft. According to various embodiments of the present disclosure, a movement of the UAV may be controlled through the rotation of the watch stem 520 (and/or the rotation of the watch-stem shaft). For example, when the watch stem 520 is rotated in a first direction, the UAV may be controlled to ascend vertically; when the watch stem 520 is rotated in a second direction, the UAV may be controlled to descend vertically. As described above, the altitude of the UAV may be controlled in upward and downward directions by the rotation of the watch stem 520.

In certain embodiments, a sensor can detect when the watch stem is rotated a certain amount in a particular direction and provide an input indicating the foregoing to the processor 210. Responsive thereto, the processor 210 can generate commands for or select a command from a command set for moving up or moving down the UAV by a particular amount corresponding to the certain amount that the watch stem is rotated.

The display 530 may be disposed on a front surface of the main body 500 to output information and may be provided as a touch screen including a touch sensor. Accordingly, the display 530 may include a touch panel to detect a touch input and may detect a user input (for example, a touch or hovering). According to one embodiment, a user interface to control a rotational movement of the UAV may be provided in a bezel area of the display 530. When the main body 500 has a circular shape, the display 530 may be divided into a first area formed with a doughnut shape in the bezel area surrounding the display 530 and a second area excluding the first area. In this case, the first area may receive a touch input to control a rotational movement of the UAV, and the second area may receive a touch input to control a movement of the UAV, such as a roll and a pitch of the UAV. A screen configuration of the display 530 will be described below in detail.

Figure 6:
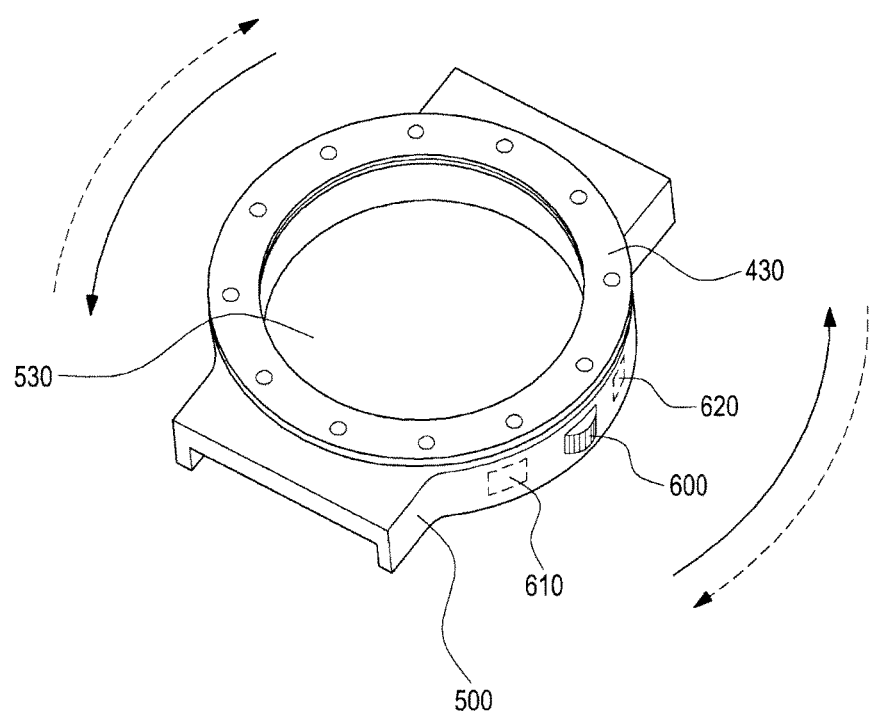
FIG. 6 schematically illustrates an electronic device according to various embodiments of the present disclosure.

FIG. 6 schematically illustrates the electronic device 101 according to various embodiments of the present disclosure.

FIG. 6 illustrates the wheel dial member 430 with a ring structure that is formed along the circumference of the touch screen 530 and is physically rotatable. A movement of a UAV, for example, a rotational movement, may be controlled by the rotation of the wheel dial member 430 with the ring structure. Here, the wheel dial member 430 may be rotated by a certain rotation angle unit so that the user feels a click sense while rotating a wheel.

According to one embodiment, a user interface configured to detect an input to move the UAV may be provided as a wheel scroll button 600 disposed to have a structure enabling a scroll in the upward and downward directions, like a mouse wheel. Here, although FIG. 6 shows that the wheel scroll button 600 is disposed at the center of a lateral side of the main body 500, the wheel scroll button 600 may be disposed at any position on an upper surface of the main body 500 as long as the user may manipulate the wheel scroll button 600 with a finger, without being limited thereto. The wheel scroll button 600 may be used to control the altitude of the UAV. For example, when the user manipulates the wheel scroll button 600 in a first direction, the processor may generate or select a command from a command set commanding the UAV to gain altitude; when the user manipulates the wheel scroll button 600 in a second direction, the processor may generate or select a command from a command set commanding the UAV to lower altitude. Alternatively, the wheel scroll button 600 may be used to control a rotational movement of the UAV, similarly to the wheel dial member 430.

According to one embodiment, the main body 500 may include an up button 620 and a down button 610 in order to detect an input to control the altitude of the UAV. These user interfaces, such as the wheel dial member 430, the wheel scroll button 600, the up button 620, and the down button 610, may be used not only to control a throttle of the UAV but to control an aux value.

Figure 7:
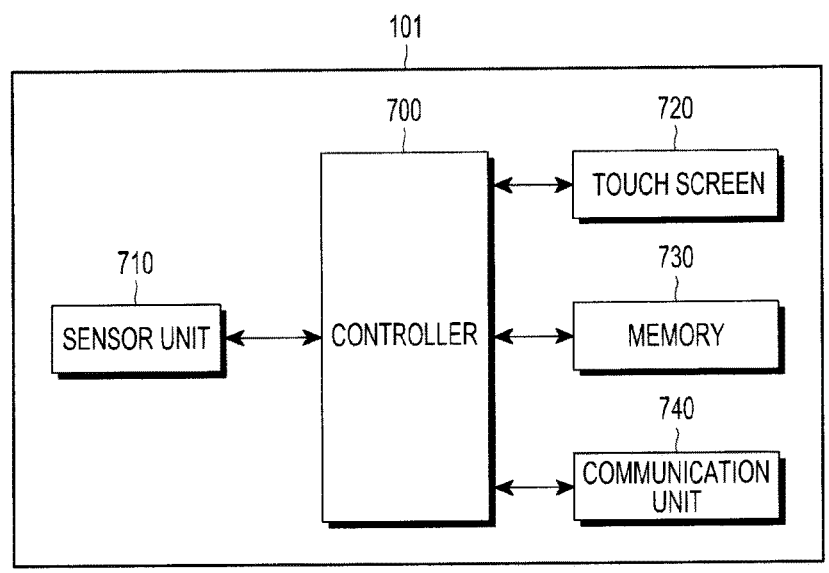
FIG. 7 is a block diagram illustrating an internal configuration of an electronic device according to various embodiments of the present disclosure.

FIG. 7 is a block diagram illustrating an internal configuration of the electronic device 101 according to various embodiments of the present disclosure.

Referring to FIG. 7, the electronic device 101 may include a controller 700, a sensor unit 710, a touch screen 720, a memory 730, and a communication unit 740.

The sensor unit 710 and the touch screen 720 provide inputs received from a user interface to the controller 700. The user interfaces can include, for example the wheel dial member 430 or a graphical user interface displayed on the touch screen 720 and allow the user to indicate a desire action to be performed by the UAV. The sensor unit 710 and touch screen 720 transform the foregoing to inputs to the controller 700. The controller 700 can then generate an appropriate control signal or command or select a command from a command set stored in the memory 730. The controller 700 provides the command to the communication unit 740 for transmission to the UAV.

The sensor unit 710 may include a plurality of sensors and may detect at least one of the state and/or position of at least part of the wheel dial member 430, the rotation or rotation angle (or rotation amount) of the wheel dial member 430, and the rotation or rotation angle (or rotation amount) of the watch stem 520. The sensor unit 710 may include a gyroscope sensor 240B to detect a movement of the electronic device 101, for example, an inclined direction, an inclined angle, and a rotation, and a geo-magnetic sensor 240D to detect a point of the compass of the electronic device 101 using a geomagnetic field. The gyroscope sensor 240B is a sensor that is capable of recognizing a total of six axes by applying rotation to each axis of an accelerometer 240E, thus recognizing a more precise movement than the accelerometer, and is capable of detecting not only acceleration and deceleration but also height and a rotation gradient. Each sensor included in the sensor unit 710 may output detected information to the controller 700, and the controller 700 may generate a control signal or select a command from a command set stored in memory to control a movement of the UAV through the detected information.

According to various embodiments of the present disclosure, the rotation or rotation angle (or rotation amount) of the wheel dial member 430 detected by the sensor unit 710 may be used to control a yaw value and a throttle value of the UAV.

According to one embodiment, when the sensor unit 710 detects that the electronic device 101 is in a horizontal state to a first reference surface, if the wheel dial member 430 is rotated, a yaw may be controlled according to the rotating direction of the wheel dial member 430. Accordingly, to rotate the UAV clockwise at the same spot, the user only needs to rotate the wheel dial member 430 clockwise, keeping the electronic device 101 fixed on the wrist horizontal. To rotate the UAV counterclockwise, the user only needs to rotate the wheel dial member 430 counterclockwise. Thus, the user may perform an intuitive control.

According to one embodiment, when the sensor unit 710 detects that the electronic device 101 is in a vertical state to the first reference surface, if the wheel dial member 430 is rotated, a throttle may be controlled according to the rotating direction of the wheel dial member 430. Accordingly, to increase or decrease the altitude of the UAV, the user, who turns the arm such that the electronic device 101 fixed, for example, on the right wrist is vertical to the first reference surface, may rotate the wheel dial member 430 in a direction of the user's gaze, that is, counterclockwise, to increase the altitude of the UAV and may rotate the wheel dial member 430 in the opposite direction, that is, clockwise, to decrease the altitude of the UAV. Turning the wheel dial member 430 with the electronic device 101 being in the vertical state may be felt by the user as turning the wheel dial member 430 upwards or downwards, thus enabling the user to perform an intuitive control also in the upward and downward directions of the UAV.

According to various embodiments of the present disclosure, when the UAV is controlled using a motion of the electronic device 101, an inclined direction and an inclined angle of the electronic device 101 may be detected using the gyro sensor. When the electronic device 101 is tilted toward the user based on the horizontal axis of the electronic device 101, the controller 700 may generate a control signal or select a command from a command set stored in memory to control the UAV to move toward the user. When the electronic device 101 is tilted toward or is rotated about the horizontal axis, the controller 700 may generate a control signal or select a command from a command set stored in memory to adjust the pitch of the UAV to control the UAV to move in a forward or backward direction. Further, when the electronic device 101 is tilted toward or is rotated about the vertical axis of the electronic device 101, the controller 700 may generate a control signal or select a command from a command set stored in memory to control the roll of the UAV to control the UAV to move in a left or right direction.

The touch screen 720 may detect a user input made with a user's finger or a pen and may output detected information to a circuit board (or a controller of the circuit board). For example, the controller 700 may display a changed screen according to the detected information on the touch screen 720. For instance, the controller 700 may control a movement of the UAV according to a touch input through the touch screen 720, simultaneously with displaying a flight control screen of the UAV that changes according to the touch input.

According to various embodiments of the present disclosure, when a touch input is received from the user through the flight control screen on the touch screen 720, the screen may display the flight of the UAV in the right, left, forward, and backward directions corresponding to the touch input. For example, the flight control screen may display an indicator that represents up, down, left, and right directions and an indicator that represents a central area indicating a touch start point and a head direction of the UAV.

According to one embodiment, a pitch control to move the UAV forward or backward may be performed through a touch input of a touch and drag from the central area of the touch screen 720 to the top or bottom of the screen. Further, a roll control to move the UAV leftwards or rightwards may be performed through a touch input of a touch and drag from the central area of the touch screen 720 to a left side or right side of the screen.

According to one embodiment, a throttle control to move the UAV in the upward and downward directions may be performed through a touch input of a multi-touch and drag, for example, with two fingers, from the central area of the touch screen 720 to the top or bottom of the screen.

According to one embodiment, when a motion event occurs instead of a touch input, any one of a left-and-right movement and a forward-and-backward movement of the UAV may be controlled corresponding to an inclined angle and an inclined direction of the electronic device 101, simultaneously with performing a throttle control to move the UAV in the upward and downward directions through a multi-touch and drag.

The memory 730 may include a volatile memory and/or a non-volatile memory. The memory 730 may store an instruction or data or command set according to a predetermined protocol or otherwise known to control the UAV, for example, associated with at least one element of the electronic device 101 and may store software and/or programs to control the UAV.

The communication unit 740 may perform communication, for example, between the electronic device 101 and the UAV. For example, the communication unit 740 may communicate with the UAV through wireless communication, such as Bluetooth and Wi-Fi. In certain embodiments, the communication unit 740 can establish a Wi-Fi P2P connection with the UAV. Here, in the case of the watch-type electronic device 101, the electronic device 101 may be connected directly to the UAV and may also be connected to the UAV through an electronic device, such as a smartphone, connected with the electronic device 101. Further, the communication unit 740 may perform communication between the electronic device 101 and a face-mounted wearable electronic device. The communication unit 740 may transmit information on the control of the UAV by the electronic device 101 and a captured image to the face-mounted wearable electronic device, and accordingly the face-mounted wearable electronic device may output a Virtual Reality (VR) screen or an image transmitted from the UAV. In this case, the user may control a movement of the UAV through the electronic device 101 worn on the wrist, while watching a screen based on the movement of the UAV through the electronic device worn on the face.

The controller 700 may include one or more of a Central Processing Unit (CPU), an Application Processor (AP), and a Communication Processor (CP). The controller 700 may perform operations or data processing, for example, for the control and/or communication of at least one of different elements of the electronic device 101.

According to various embodiments of the present disclosure, the controller 700 may control a plurality of control element values, such as a roll, a pitch, a yaw, and a throttle, of the UAV based on a touch input and the rotation of the wheel dial member 430. Specifically, the controller 700 may generate a control instruction message or select a command from a command set based on a touch input or the rotation of the wheel dial member 430 and may transmit the control instruction message to the UAV 800, thereby controlling the UAV 800.

According to one embodiment, when the user touches and drags the central area of the touch screen of the electronic device 101, the electronic device 101 may generate a control instruction message or select a command from a command set to control at least one of a roll and a pitch of the UAV 800 corresponding to the touch and drag input.

For example, a configuration of a roll-pitch control instruction message to control at least one of a roll and a pitch may be determined with an identifier (for example, 'control-roll-pitch-data-req') indicating that the message is for controlling at least one of a roll and a pitch and an integer ranging from −180 to +180 for a roll value or an integer also ranging from −180 to +180 for a pitch value. The roll value and the pitch value may each be determined based on the distance, speed, or direction of a touch and drag from the central area of the touch screen. That is, the absolute value becomes greater with a longer distance from the center point, and the UAV moves at a higher speed with the greater absolute value.

When the roll-pitch control instruction message is received, the UAV 800 moves by a determined flight distance corresponding to the pitch value in the roll-pitch control instruction message, forward when the pitch value is a positive value, and backward when the pitch value is a negative value. Likewise, the UAV 800 moves by a determined flight distance corresponding to the roll value in the control instruction message, rightwards when the roll value is a positive value, and leftwards when the roll value is a negative value. Here, the roll value and the pitch value each have a greater absolute value, the UAV 800 moves at a higher flight speed.

Meanwhile, a yaw control instruction message may include an identifier (for example, 'control-yaw-data-req') indicating that the message is for a yaw control and an integer ranging from 0° to 360°. The yaw value is to change a direction in which a head of the UAV points, ranges from 0° to 360° based on north, and indicates a value from the absolute direction. The yaw value may be determined based on the rotation direction and rotation angle (or rotation amount) of the wheel dial member 430. That is, as the rotation angle of the wheel dial member 430 becomes wider, the absolute value is greater, and accordingly the UAV may rotate at a higher speed.

Meanwhile, a throttle control instruction message may include an identifier (for example, 'control-throttle-data-req') indicating that the message is for a throttle control and 'up' or 'down' direction information. The throttle control instruction message is to adjust altitude and thus includes direction information on up or down, such as an upward direction or downward direction, instead of a specific numerical value. The throttle control instruction message may be generated corresponding to a user input using a multi-touch method or may be generated corresponding to a rotational manipulation of the wheel dial member 430 or a touch and drag input from one of divided upper and lower display areas to the other area.

For example, when the multi-touch method is used, the user may increase the altitude of the UAV 800 by performing a touch and upward drag with two fingers on the touch screen, while the user may decrease the altitude of the UAV 800 by performing a touch and downward drag with two fingers.

Further, when the rotational manipulation of the wheel dial member 430 is used, a yaw control or throttle control may be performed according to a position of the electronic device 101, such as a horizontal state in which the electronic device 101 is parallel, substantially parallel or within 10 degrees of parallel, with a first reference surface or a vertical state in which the electronic device 101 is vertical to the first reference surface. For example, when the user wearing the electronic device 101 on the wrist gazes at the back of the user's hand, that is, when the electronic device 101 is in a horizontal position parallel, substantially parallel or within 10 degrees of parallel, with the first reference surface, the electronic device 101 generates a control instruction message for a yaw control corresponding to the rotation of the wheel dial member 430. When the user gazes at the user's palm, that is, when the electronic device 101 is in a vertical position orthogonal, substantially orthogonal, or within 10 degrees of orthogonal to the first reference surface, the electronic device 101 may generate a control instruction message for a throttle control corresponding to the rotation of the wheel dial member 430.

When a touch and drag input from one of divided upper and lower display areas to the other area is detected, the electronic device 101 may generate a control instruction message for a throttle control of the UAV corresponding to a direction of the touch and drag.

As described above, the controller 700 may transmit a control instruction message for roll, pitch, yaw, and throttle controls to the UAV 800 and may receive a direction information message from the UAV 800. Since direction information on the UAV displayed on the touch screen 720 needs to correspond to the head direction of the UAV 800, the controller 700 needs to know a current yaw value of the UAV 800 to synchronize the direction information. Thus, the UAV 800 may perform an operation of detecting a change in yaw value and may generate a corresponding direction information message to transmit the message to the electronic device 101. The direction information message may have the same configuration as a control instruction message for a yaw control and may include, for example, an identifier (for example, 'drone-direction-data') to indicate the direction information message and an integer ranging from 0° to 360°.

According to various embodiments of the present disclosure, the user may intuitively control a greater number of elements than an existing controller and may perform precise control due to easy user manipulations.

A process of operations between the electronic device 101 and a UAV is described.

First, when the electronic device 101 detects a UAV using a short-range communication mode and establishes a connection for communication (for example, Bluetooth pairing) with the UAV, the electronic device 101 may exchange communication data with the UAV. When communication is connected with the UAV, the electronic device 101 receives state information on the UAV, and transmits an automatic takeoff control message to take off the UAV to the UAV before the UAV takes off. Accordingly, the UAV automatically measures altitude and distance to take off. When the UAV stably hovers after automatically taking off, the UAV enters a manual mode in which the user manually manipulates the UAV via the electronic device 101. Here, the UAV and the electronic device 101 exchange pieces of sensed information with each other to synchronize the directions of the UAV and the electronic device 101, and accordingly head direction information on the UAV may be displayed on the screen of the electronic device 101. Further, in the control of a long-distance UAV, GPS data may be used to synchronize the display directions of the UAV and the electronic device 101.

Subsequently, the electronic device 101 may detect an input to move the UAV to transmit a control instruction, may receive a response to the control instruction from the UAV, and may perform control based on the response. To land the UAV, the electronic device 101 transmits an instruction for landing, and disconnects from the UAV upon receiving state information indicating a landing from the UAV. For example, to land the UAV after finishing the manipulation of the UAV, the electronic device 101 switches to a landing mode to give an instruction to land, and the UAV automatically adjusts altitude and makes a stable landing.

Modes for communication between the UAV and the electronic device 101 may be generally divided into a mode in which the electronic device 101 is directly wirelessly connected to the UAV (such as with a Wi-Fi P2P Connection) and a mode in which the electronic device 101 is wirelessly connected to the UAV through a main electronic device, for example, a smartphone, if the electronic device 101 is an accessory type, such as a watch type. Here, messages exchanged between the electronic device 101 and the UAV have the same format, and the main electronic device operates as an intermediate connection medium. That is, the main electronic device transmits a control instruction from the electronic device 101 to the UAV and transmits state information including a direction from the UAV to the electronic device 101. When a change in direction information according to a movement is detected, the UAV transmits state information including direction information based on the detected change to the electronic device 101, and the electronic device 101 performs synchronization based on the state information. Accordingly, the electronic device 101 may reflect and display information based on a flight direction of the UAV in real time.

The state information transmitted by the UAV can comprise messages according to a predetermined protocol or standard or otherwise understood beforehand by the electronic device 101. For example, the controller 700 can execute an application program that interprets the messages or accesses a library that translates the messages to inputs to the controller 700.

Figure 8A:
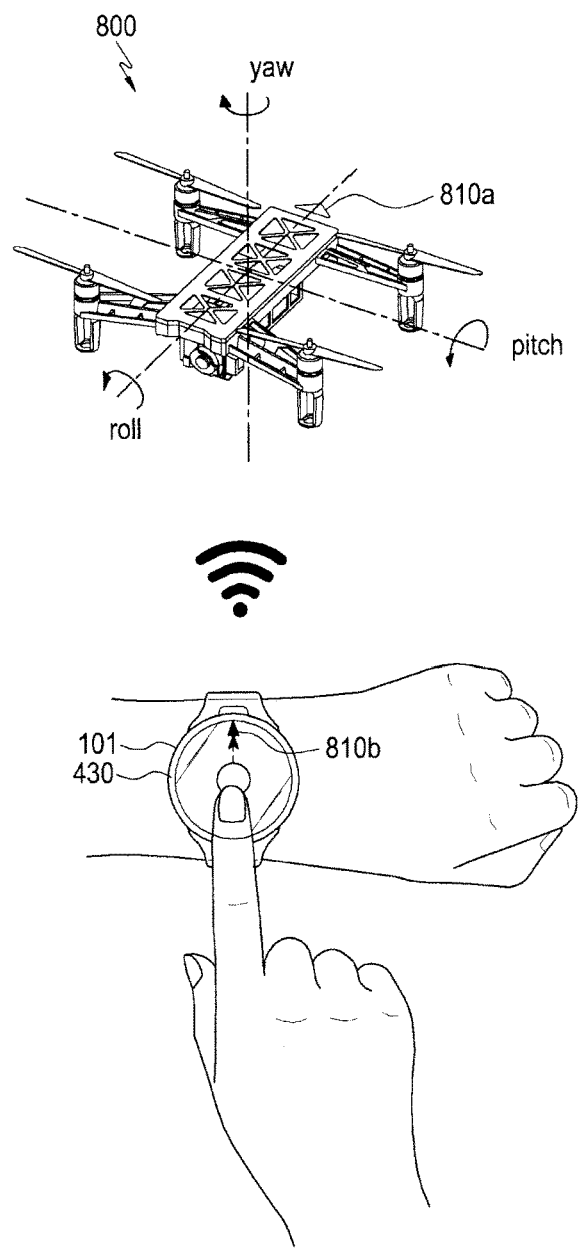
FIG. 8A illustrates a method of controlling an unmanned aerial vehicle using a touch screen of an electronic device according to various embodiments of the present disclosure.

FIG. 8A illustrates a method of controlling the UAV using the touch screen of the electronic device 101 according to various embodiments of the present disclosure.

Referring to FIG. 8A, the screen of the electronic device 101 may display flight state information including direction information 810b corresponding to a head direction 810a of the UAV 800. Here, the head direction of the UAV 800 indicates a reference direction for the user to perform roll and pitch controls, and may indicate a direction in which a camera lens heads if a camera is installed. The head direction can indicate the forward direction.

As illustrated in FIG. 8A, when the user touches and drags the central area on the touch screen of the electronic device 101, the electronic device 101 may generate a control signal or select a command from the command set causing the UAV 800 to perform a roll or pitch control, corresponding to the touch and drag. The electronic device 101 may generate a control instruction message to control at least one of a roll and a pitch of the UAV 800 corresponding to the touch and drag input.

Figure 8B:
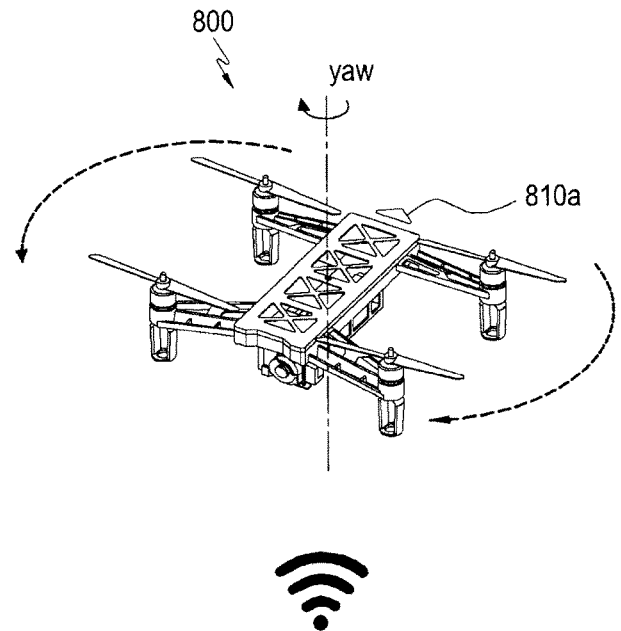
FIG. 8B illustrates a method of controlling an unmanned aerial vehicle using a wheel dial member of an electronic device according to various embodiments of the present disclosure.
Figure 8B:
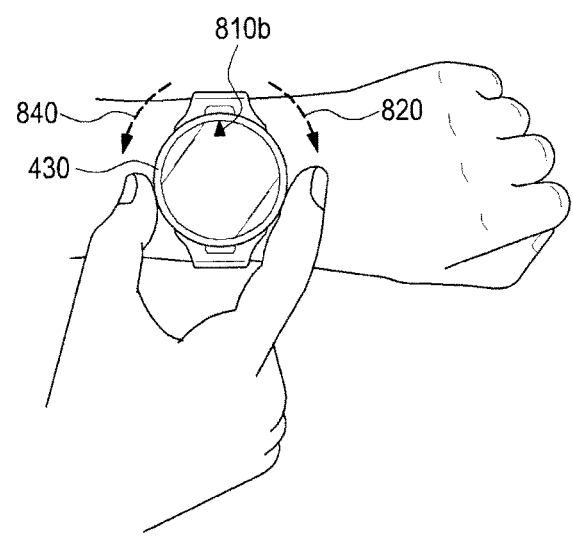

FIG. 8B illustrates a method of controlling the UAV using the wheel dial member of the electronic device 101 according to various embodiments of the present disclosure.

Referring to FIG. 8B, when the user rotates the wheel dial member 430 clockwise 820 or counterclockwise 840 while displaying the flight state information including the direction information 810b corresponding to the head direction 810a in which a camera of the UAV 800 is mounted, the electronic device 101 may perform a yaw control of the UAV 800 corresponding to the rotation. Accordingly, the electronic device 101 may generate a control instruction message or select a command from the command set causing the UAV 800 to for a yaw control of the UAV 800 and may transmit the control instruction message or command to the UAV 800.

Figure 9A:
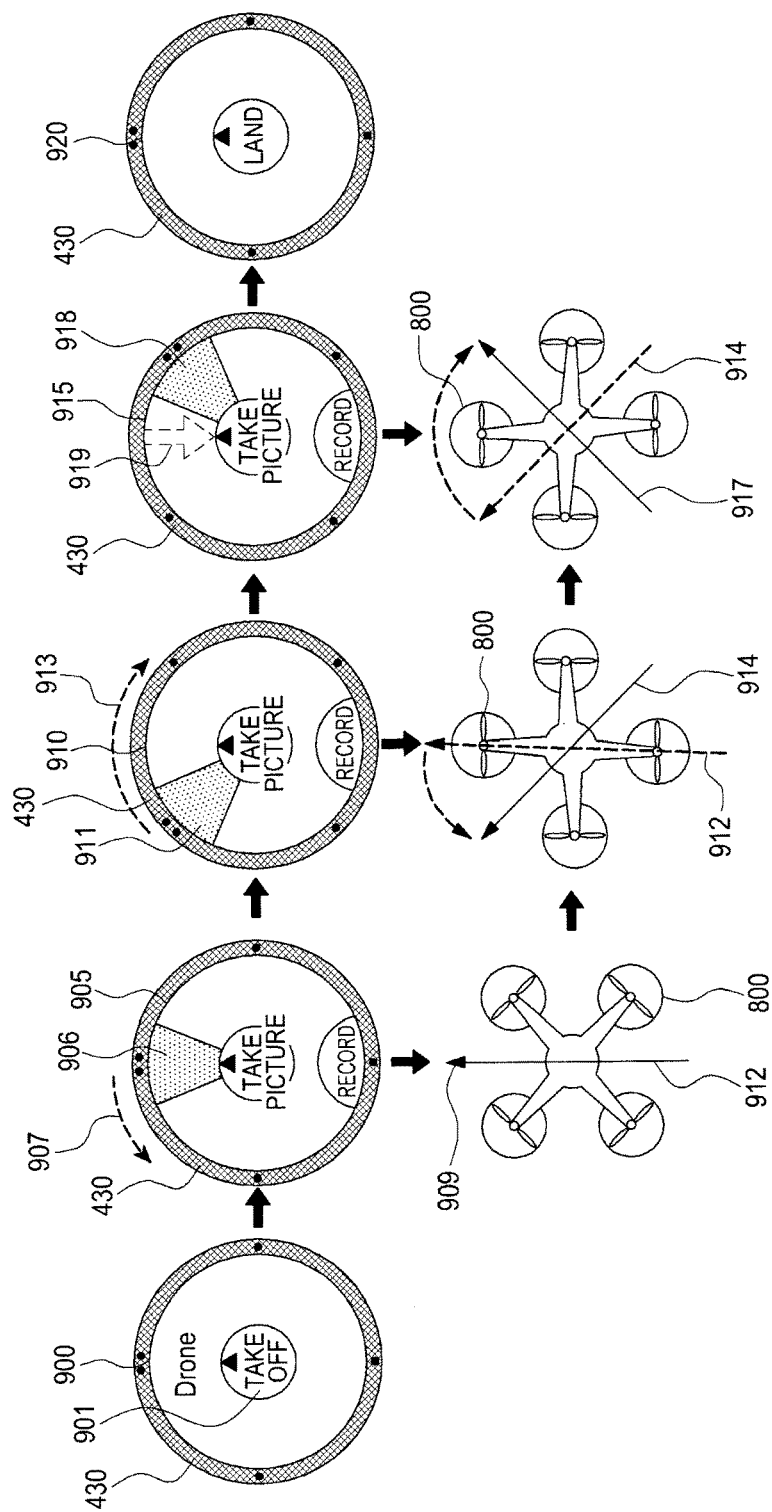
FIG. 9A, FIG. 9B and FIG. 9C illustrate screens to describe flight state screens of an electronic device according to various embodiments of the present disclosure.
Figure 9B:
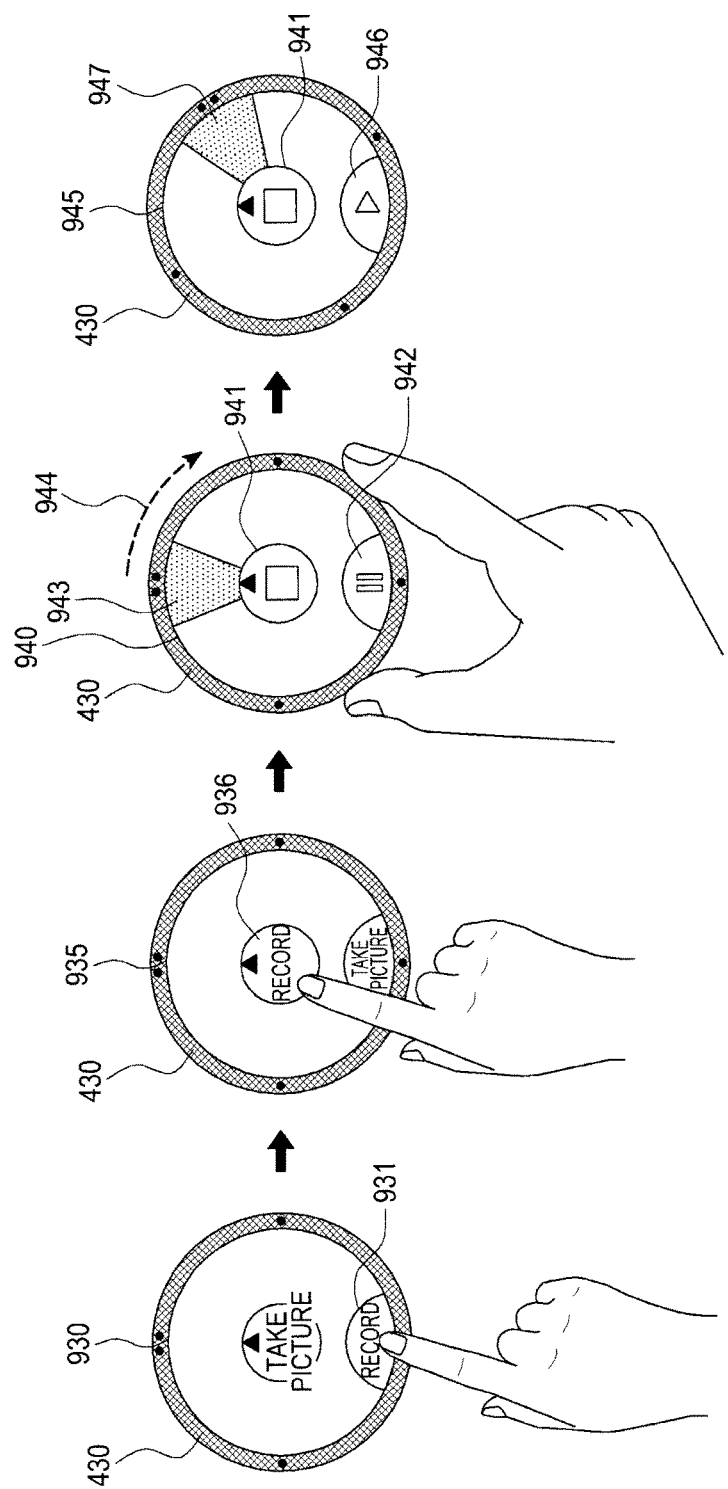
Figure 9C:
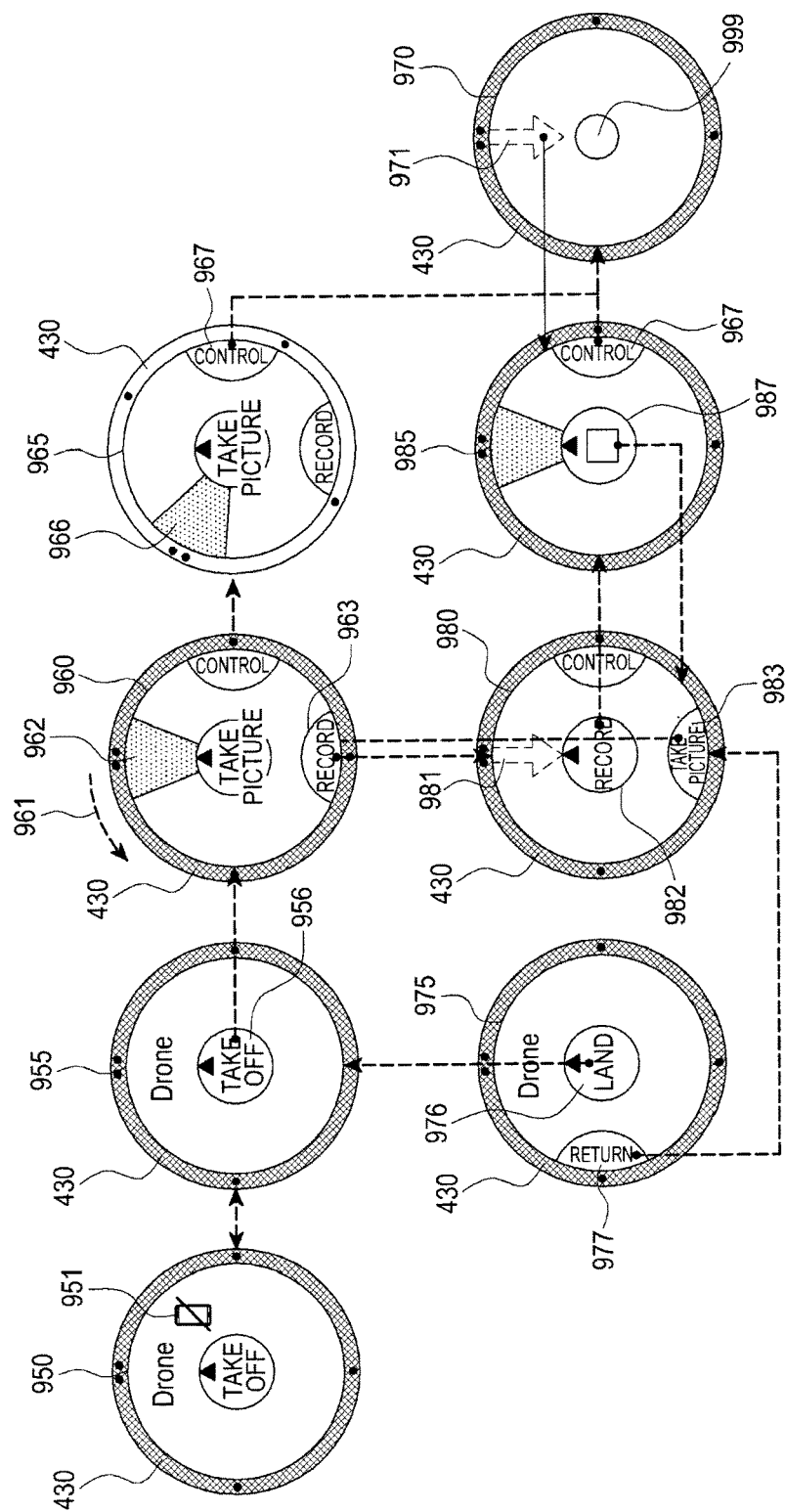

FIG. 9A to 9C illustrate screens to describe flight state screens of the electronic device 101 according to various embodiments of the present disclosure.

First, FIG. 9A illustrates a change in the head direction of the UAV 800 by a manipulation of the wheel dial member 430.

Referring to FIG. 9A, when the user presses a takeoff button 901 displayed on the central area on a first flight state screen 900, the UAV 800 takes off. Accordingly, the screen may switch to a second flight state screen 905 so that the user manipulates the UAV 800. The second flight state screen 905 may display head direction information 906 corresponding to a reference line 912 indicating the head direction 909 of the UAV 800. The head direction information 906 may be displayed in various forms, such as an icon, an indicator, and an area, and may correspond to a position of the wheel dial member 430. Here, when the user turns the wheel dial member 430 counterclockwise 907, the electronic device 101 may transmit a control instruction including a yaw value corresponding to the rotation amount of the wheel dial member 430 to the UAV 800, so that a third flight state screen 910 including head direction information 911 changed corresponding to a rotating track of the wheel dial member 430 may be displayed.

When the user turns the wheel dial member 430 counterclockwise 907, the reference line 912 corresponding to the head direction of the UAV 800 may also be rotated 914 counterclockwise corresponding to the rotation amount of the wheel dial member 430. When the user rotates the wheel dial member 430 clockwise 913 on the third flight state screen 910, the reference line 914 corresponding to the head direction of the UAV 800 may be rotated 917 clockwise by the rotation amount. When the user turns the wheel dial member 430 clockwise 913, a fourth flight state screen 915 including head direction information 918 changed corresponding to a rotating track of the wheel dial member 430 may be displayed. Further, when the user makes a touch and drag 919 to the central area as in the fourth flight state screen 915 while controlling the flight of the UAV 800, an instruction for landing is implemented, so that a screen 920 indicating a landing-completed state may be displayed. The touch and drag to the central area may correspond to a back button key or landing key.

FIG. 9B illustrates a method for controlling a camera picture and recording function in the UAV 800, when the UAV 800 has a camera installed.

As illustrated in FIG. 9B, a first flight state screen 930 may include a record mode switch button 931 at the bottom of the screen. Thus, when the user touches the record mode switch button 931, the electronic device 101 may switch to a record mode and may display a record mode screen 935. The record mode screen 935 may include a RECORD button 936 to start recording and a TAKE PICTURE button to go back to the previous flight state screen. When the user touches the RECORD button 936, recording is started and recording-related functional buttons 941, 942, and 946 may be displayed on record mode screens 940 and 945. The user may adjust a picture-taking direction by rotating 944 the wheel dial member 430 during recording, and the electronic device 101 may display 947 the head direction information 943 changed corresponding to a rotating track of the wheel dial member 430 according to the rotation of the wheel dial member 430.

FIG. 9C illustrates screens corresponding to selections of buttons disposed on a flight state screen.

Referring to FIG. 9C, a first screen 950 is a screen displayed before the UAV 800 takes off, which displays an indicator 951 indicating that communication between the electronic device 101 and the UAV 800 has not yet been connected. When communication between the electronic device 101 and the UAV 800 is connected, a second screen 955 including a takeoff button 956 may be displayed. When the takeoff button 956 is touched on the second screen 955, a third screen 960 may display a record mode switch button 963 and a reference area 962 indicating the current position of the wheel dial member 430. Further, a fourth screen 965 may be displayed corresponding to a counterclockwise 961 rotation of the wheel dial member 430, and may display head direction information 966 on the UAV 800 corresponding to the current rotation angle of the wheel dial member 430 and a control mode switch button 967 for roll and pitch controls. When the record mode switch button 963 is touched on the third screen 960, a fifth screen 980 is displayed. When a RECORD button 982 for recording is touched on the fifth screen 980, recording may be started and recording-related functional buttons 987 may be displayed on a sixth screen 985. Further, when a TAKE PICTURE button 983 is touched on the fifth screen 980, the third screen 960 may be displayed.

Here, a CONTROL button 967 is touched on the fourth screen 965 or the sixth screen 985, the mode may be switched to a control mode for roll and pitch controls and accordingly a seventh screen 970 may be displayed. The seventh screen 970 is a screen to control a roll or pitch of the UAV 800 according to a direction of a touch and drag. A touch and drag 971 to the central area on the seventh screen corresponds to a back button key, which allows the user to go back to a previous screen, that is, the sixth screen 985.

In the seventh screen 970, a virtual joystick 999 is shown which the user can control in a manner similar to a joystick as will be further described in FIGS. 15A, 15B, 16A, and 16B.

When a touch and drag 981 to the central area is made on the fifth screen 980, a landing instruction button 976 and a return button 977 may be displayed on an eighth screen 975. Here, the touch and drag 981 to the central area on the fifth screen 980 may be an instruction to return to the initial screen. When the landing instruction button 976 is touched on the eighth screen 975, the second screen 955 may be displayed. When the return button 977 is displayed on the eight screen 975, the user may return to the fifth screen 980.

Figure 10A:
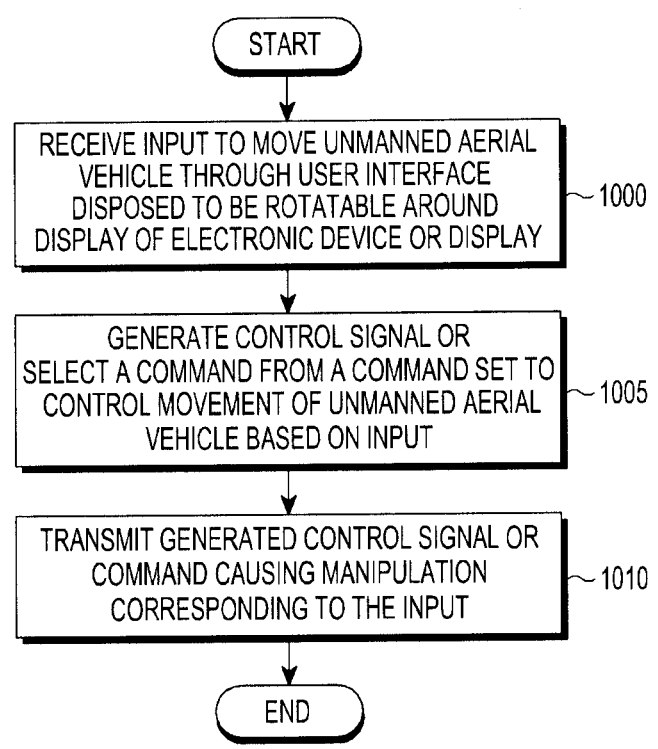
FIG. 10A is a flowchart illustrating a method for an electronic device to control an unmanned aerial vehicle according to various embodiments of the present disclosure.

FIG. 10A is a flowchart illustrating a method for an electronic device to control a UAV according to various embodiments of the present disclosure.

Referring to FIG. 10A, when a UAV control mode is activated in the wearable electronic device 101, the electronic device 101 may display information associated with a movement of the UAV on a flight state screen. With the flight state screen displayed, the electronic device 101 may receive an input through at least one of a user interface (for example, the wheel dial member 430), which is disposed to be rotatable around a display of the electronic device 101 and is configured to detect an input to move the UAV, and the display in operation 1000. Subsequently, in operation 1005, the electronic device 101 may generate a control signal or select a command from a command set to control a movement of the UAV 800 based on the input. In operation 1010, the electronic device 101 transmits the generated control signal or selected command from the command set to the UAV 800, thereby causing manipulation of the UAV corresponding to the input. This control process is described in detail with reference to FIG. 10B.

Figure 10B:
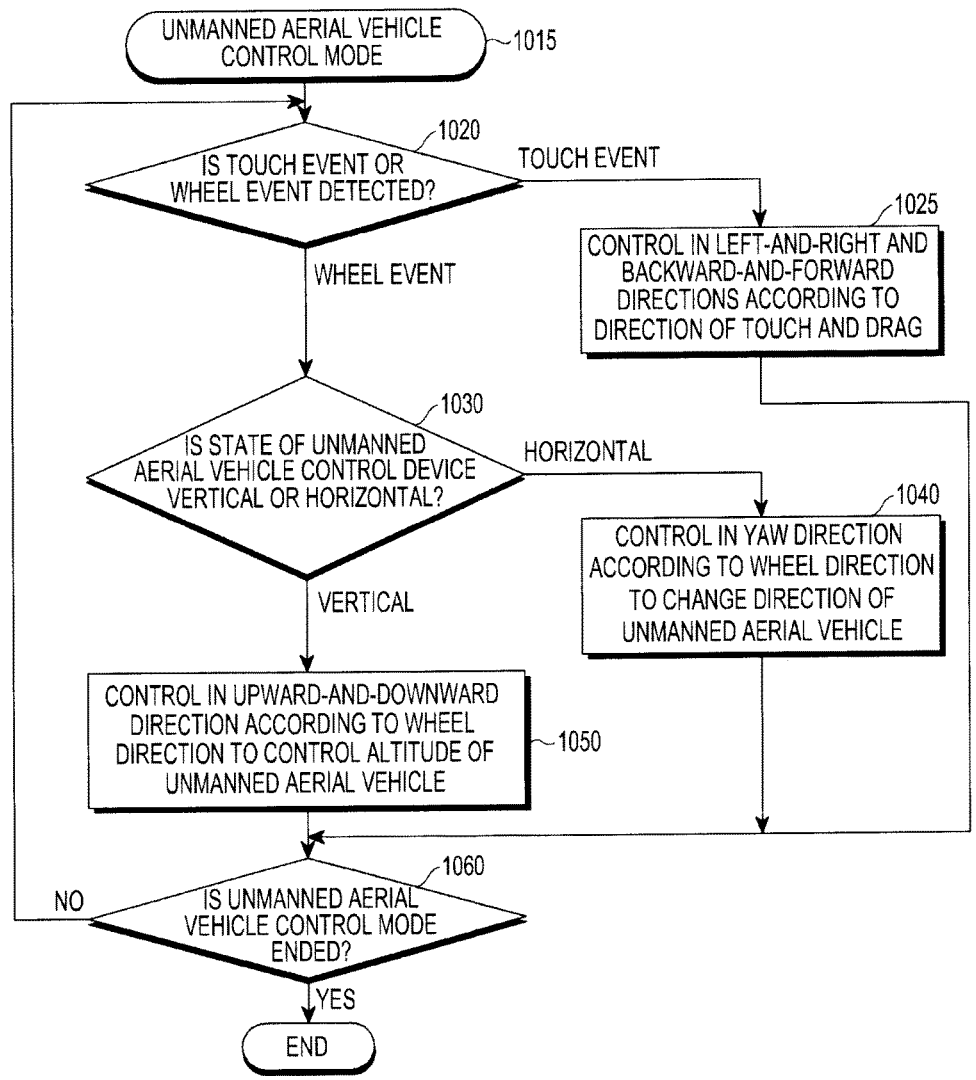
FIG. 10B is a flowchart illustrating operations of an electronic device to control an unmanned aerial vehicle according to one embodiment of the present disclosure.

FIG. 10B is a flowchart illustrating operations of the electronic device 101 to control the UAV according to one embodiment of the present disclosure. FIG. 10b illustrates operations performed after the UAV 800 automatically takes off via a connection established between the electronic device 101 and the UAV 800.

Referring to FIG. 10B, when the electronic device 101 switches to the UAV control mode in operation 1015, the electronic device 101 may determine whether a touch event or wheel event is detected in operation 1020. When a touch event is detected, the electronic device 101 may transmit a control signal or select a command from the command set causing the UAV 800 to perform at least one of a left-and-right control and a backward-and-forward control according to the direction of a touch and drag in operation 1025. When a wheel event is detected in operation 1020, that is, a wheel event occurring by the rotation of the wheel dial member 430 of the electronic device 101 is detected, the electronic device 101 may determine whether a UAV control device, that is, the electronic device 101, is in the vertical state or the horizontal state based on detection information detected by the sensor unit in operation 1030.

When the electronic device 101 is in the horizontal state of being horizontal to a first reference surface, the electronic device 101 may transmit a control signal or select a command from the command set causing the UAV 800 to control the rotation direction of the UAV 800 according to a wheel rotating direction in order to change the direction of the UAV in operation 1040. When the electronic device 101 is in the vertical state of being orthogonal, substantially orthogonal, or within 10 degrees of orthogonal, to the first reference surface, the electronic device 101 may transmit a control signal or select a command from the command set causing the UAV 800 to perform an upward-and-downward control of the UAV 800 according to the wheel rotating direction in order to control the altitude of the UAV 800 in operation 1050. Here, a control instruction message for a throttle control of the UAV may include information on one of upward and downward directions. Next, when a UAV control mode end event occurs, for example, by pressing a back key, in operation 1060, the electronic device 101 ends the UAV control mode. However, the foregoing operations may be repeated as long as the UAV control mode is not ended. As described above, the control of the UAV 800 using the wheel dial member 430 may be generally performed separately when the electronic device 101 is in the horizontal state based on the first reference surface, for example, as being placed on the floor, and when the electronic device 101 is in the vertical state to the first reference surface, for example as being orthogonal, substantially orthogonal, or within 10 degrees of orthogonal, to the ground.

Figure 11A:
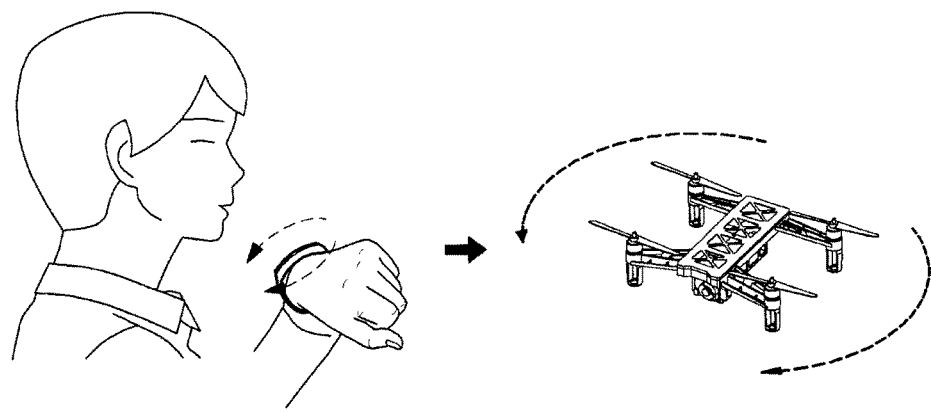
FIG. 11A, FIG. 11B and FIG. 11C illustrate a movement change of an unmanned aerial vehicle according to a motion of a user wearing an electronic device according to one embodiment of the present disclosure.
Figure 11B:
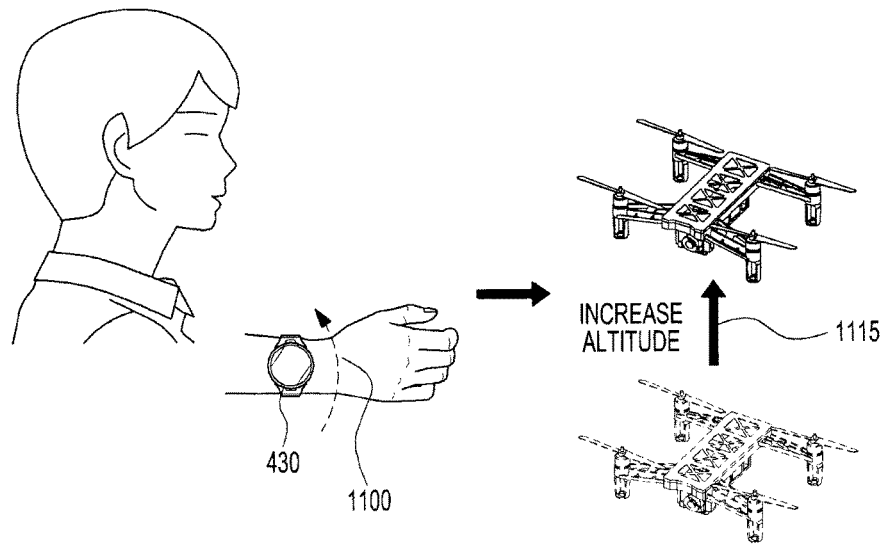
Figure 11C:
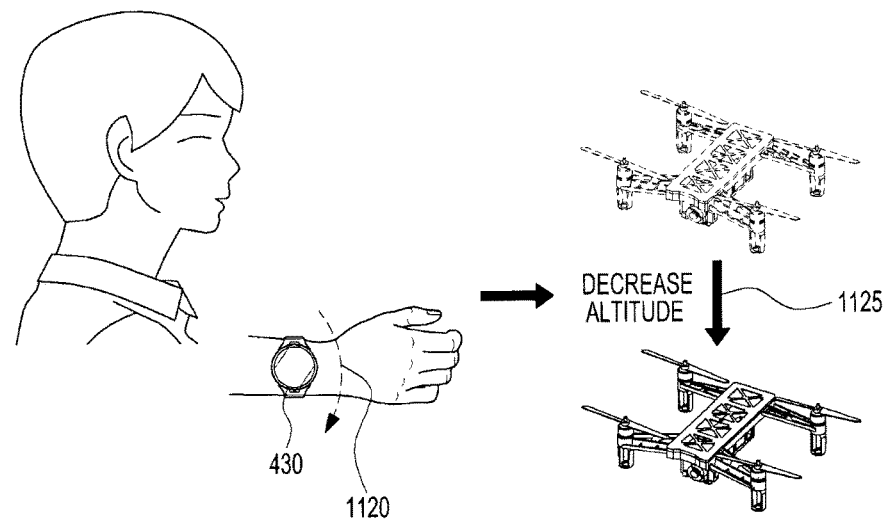

FIG. 11A to FIG. 11C illustrate a movement change of the UAV according to a motion of the user wearing the electronic device 101 according to one embodiment of the present disclosure.

FIG. 11A illustrates that the user is looking at the electronic device 101 worn on the wrist, that is, the electronic device 101 is in the horizontal state of being horizontal to the first reference surface. When the wheel dial member 430 is rotated in the horizontal state, the UAV 800 is rotated on the spot. However, when the user turns the wrist wearing the electronic device 101 outwards as in FIG. 11B while using the wheel dial member 430 in the horizontal state in which the user gazes at the front surface of the electronic device 101, the front surface of the electronic device 101 looks in the opposite direction of the user. When the electronic device 101 becomes orthogonal, substantially orthogonal, or within 10 degrees of orthogonal, to the first reference surface, the wheel dial member 430 may be used to control the altitude of the UAV 800, instead of the rotation of the UAV 800. When the electronic device 101 is placed vertically, the wheel dial member 430 is also rotated in the vertical direction. Thus, when the user rotates 1100 the wheel dial member 430 in the upward direction as in FIG. 11B, the electronic device 101 may transmit a throttle control instruction message including corresponding upward direction information to the UAV 800, thereby performing a control of increasing 1115 the altitude of the UAV 800. On the contrary, when the user rotates 1120 the wheel dial member 430 in the downward direction as in FIG. 11C, the electronic device 101 may transmit a throttle control instruction message including corresponding downward direction information, thereby performing a control of decreasing 1125 the altitude of the UAV 800. As described above, the user may recognize that the wheel dial member 430 is rotated in the vertical direction when the electronic device 101 is in the vertical position, thus enabling the user to perform an intuitive manipulation of the height of the UAV 800.

Figure 12:
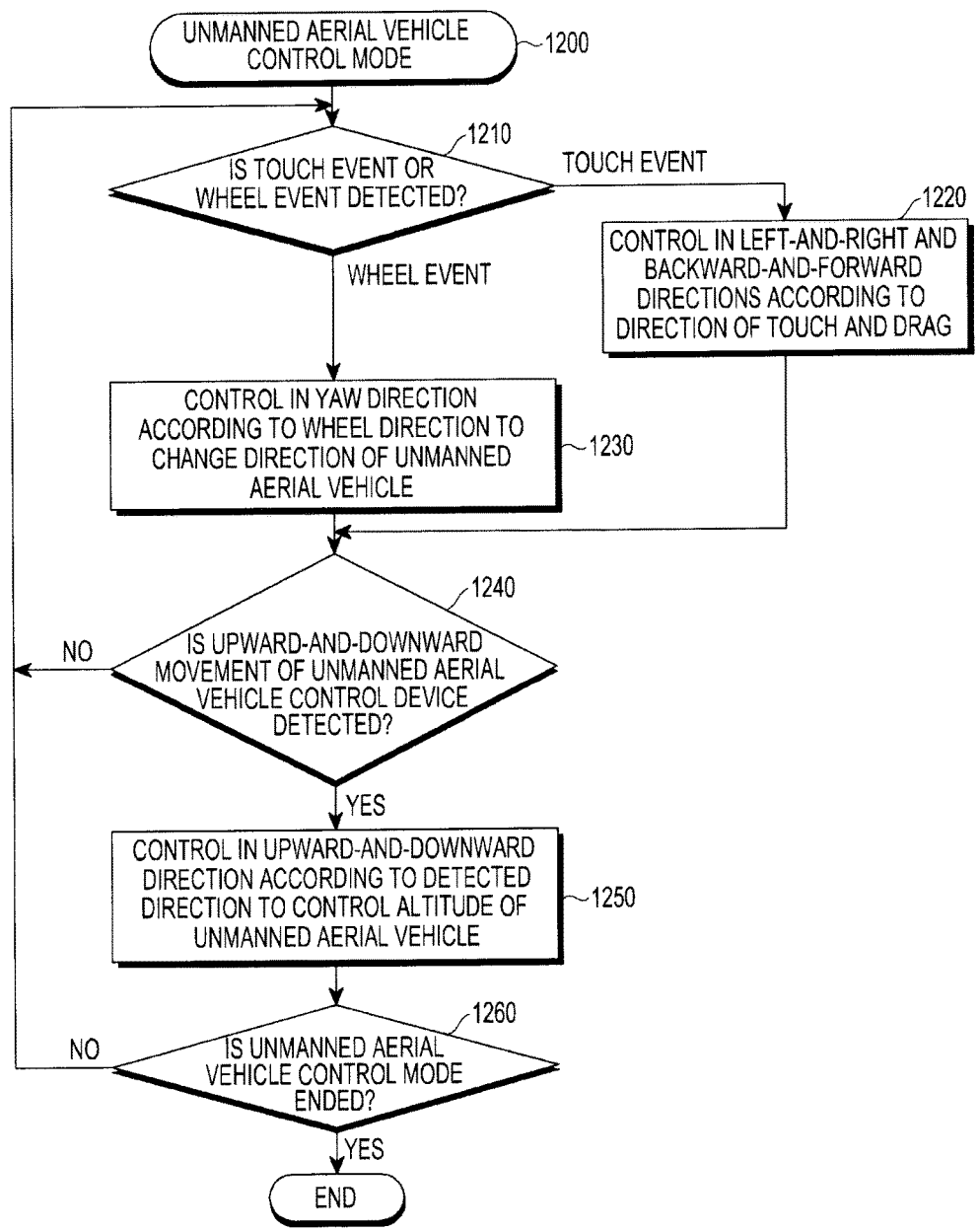
FIG. 12 is a flowchart illustrating operations of an electronic device to control an unmanned aerial vehicle according to another embodiment of the present disclosure.

FIG. 12 is a flowchart illustrating operations of the electronic device 101 to control the UAV according to another embodiment of the present disclosure. FIG. 12 illustrates the flow of operations performed when an input to control a movement of the UAV 800 occurs, also assuming that the electronic device 101 is connected to the UAV 800 and enters a UAV 800 control mode.

Referring to FIG. 12, operations 1200 to 1220 correspond to operations 1015 to 1025 of FIG. 10B, and thus a detailed description thereof is omitted herein. When a wheel event is detected in operation 1210, the electronic device 101 may generate control signals or select a command from the command set to control the rotation direction of the UAV 800 according to a wheel rotating direction in order to change the direction of the UAV in operation 1230. Subsequently, the electronic device 101 may determine whether an upward-and-downward movement of a UAV control device, that is, the electronic device 101, is detected based on information detected by the sensor unit in operation 1240. For example, the electronic device 101 may detect an upward-and-downward movement of the electronic device 101 based on sensor information, such as a movement change, a movement angle, and a movement direction of the electronic device 101, according to a motion of raising or lowering the wrist wearing the electronic device 101.

Here, to determine a reference point for calculating a direction or angle of the moving electronic device 101 based on a current position defined as 0, a movement value of the electronic device 101 detected while a touch input in a predetermined area on the screen of the electronic device 101 is maintained may be used. Thus, when an upward-and-downward movement of the electronic device 101 is detected in operation 1240 while the touch input through the touch screen of the electronic device 101 is maintained, the electronic device 101 may generate control signals or select a command from the command set to control the UAV 800 in the upward or downward direction according to a detected direction in order to control the altitude of the UAV 800 in operation 1250. Subsequently, the foregoing operations may be repeated as long as the UAV control mode is not ended in operation 1260.

Screens of the electronic device 101 to control the UAV according to another embodiment of the present disclosure are described below with reference to FIG. 13A and FIG. 13B.

Figure 13A:
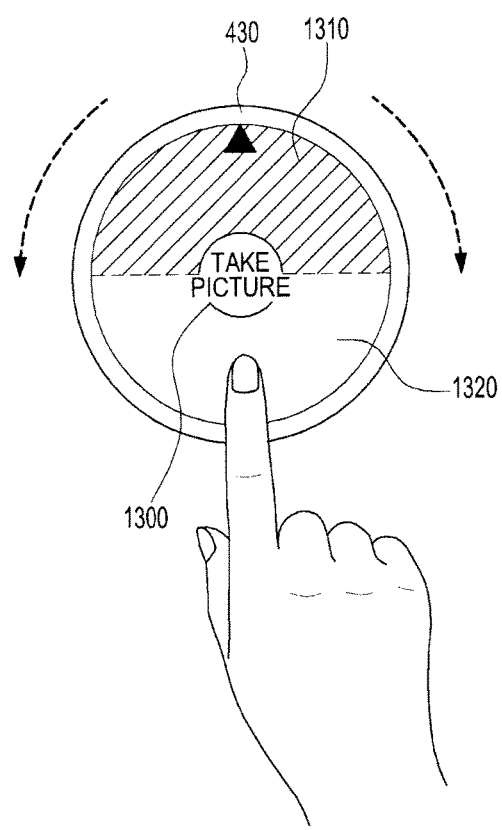
FIG. 13A and FIG. 13B illustrate screens of an electronic device to control an unmanned aerial vehicle according to another embodiment of the present disclosure.

First, referring to FIG. 13A, a flight control screen may include two divided areas 1310 and 1320 and a central area 1300. Although FIG. 13A illustrates the areas 1310 and 1320 divided up and down to describe a pitch control or throttle control operation, areas divided right and left may be used for a roll control.

According to one embodiment, the electronic device 101 may generate control signals or select a command from the command set to perform a throttle control of increasing or decreasing the altitude of the UAV 800 according to a touch input in an upper area 1310 or a lower area 1320.

According to one embodiment, when the rotation of the wheel dial member 430 is detected while a touch in the upper area 1310 or the lower area 1320 is maintained, the electronic device 101 may generate control signals or select a command from the command set to perform the throttle control of the UAV 800. That is, the rotation of the wheel dial member 430 may be used to generate control signals or select a command from the command set to control the altitude of the UAV 800 in the upward and downward directions, instead of for a yaw control.

According to one embodiment, when the rotation of the wheel dial member 430 is detected while a touch in the upper area 1310 or the lower area 1320 is maintained, the electronic device 101 may generate control signals or select a command from the command set to simultaneously perform a throttle control and a yaw control of the UAV 800. For example, when the user rotates the wheel dial member 430 while touching the upper area 1310 of the screen, the UAV 800 may be rotated, simultaneously with flying upward.

According to one embodiment, when a touch and drag input from one of the two areas 1310 and 1320 to the other area is simultaneously detected with the rotation of the wheel dial member 430, the electronic device 101 may generate control signals or select a command from the command set to perform a pitch control and a throttle control of the UAV 800 at the same time. For example, when the user performs a wheel manipulation and a touch and drag manipulation from the lower area 1320 to the upper area 1310 at the same time, the electronic device 101 may transmit a control instruction message with an adjusted yaw value, simultaneously with increasing a pitch value, thus achieving a complex control. In this case, the UAV 800 moves forward by the increased pitch value, simultaneously with changing the direction due to the yaw value increased by the wheel manipulation. Accordingly, the UAV may move forward or backward, simultaneously with changing the direction, thus enabling the user not only to experience a manipulation like a cornering of a car but also to perform a more precise control.

Although the foregoing description is made with reference to the divided upper and lower areas 1310 and 1320 as an example, the aforementioned method may also be applicable to areas divided right and left. Further, the electronic device 101 may generate control signals or select a command from the command set to perform a yaw control along with a roll and/or pitch control by distinguishing the direction of a touch and drag, instead of dividing these areas. For example, when the user performs a wheel manipulation and a touch and drag manipulation from a left area to a right area at the same time, the electronic device 101 may generate control signals or select a command from the command set to simultaneously perform a roll control and a yaw control of the UAV 800.

As described above, the electronic device 101 may generate control signals or select a command from the command set to perform a complex control of the UAV 800 including roll, pitch, and yaw controls corresponding to one of a touch input maintained in one area and a touch and drag input from one area to another area, and may perform a rotational manipulation. That is, for a complex manipulation of the UAV 800, a rotational manipulation of the wheel dial member 430 may be combined with various touch input events, without being limited to the foregoing combinations.

In addition to a complex control of roll, pitch, and yaw controls, a complex control of throttle and yaw controls is also possible, which is described in detail with reference to FIG. 14A and FIG. 14B. Here, FIG. 14A and FIG. 14B illustrate a movement change of the UAV according to a motion of the user wearing the electronic device 101 according to another embodiment of the present disclosure.

Figure 14A:
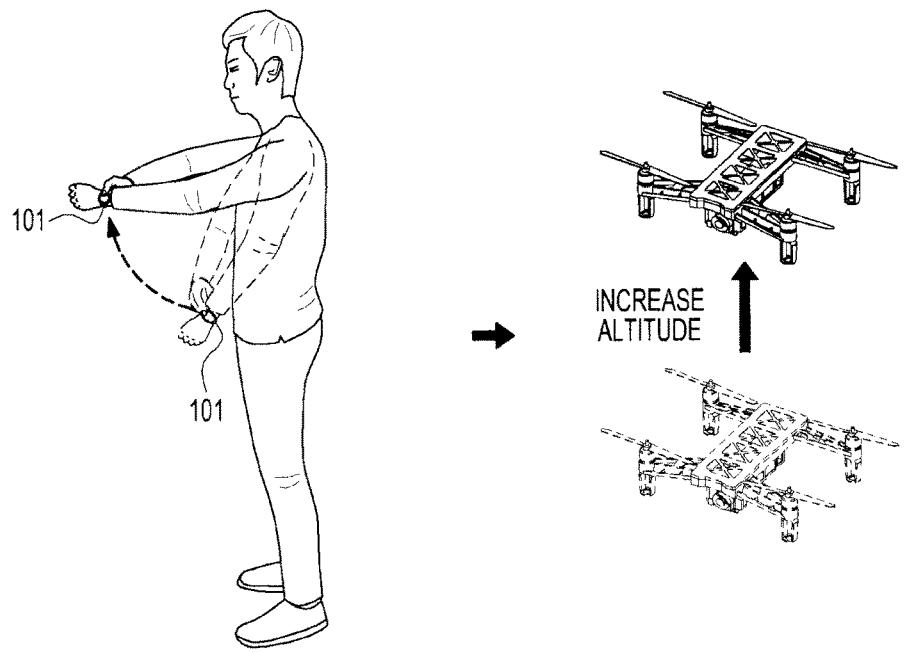
FIG. 14A and FIG. 14B illustrate a movement change of an unmanned aerial vehicle according to a motion of a user wearing an electronic device according to another embodiment of the present disclosure.
Figure 14B:
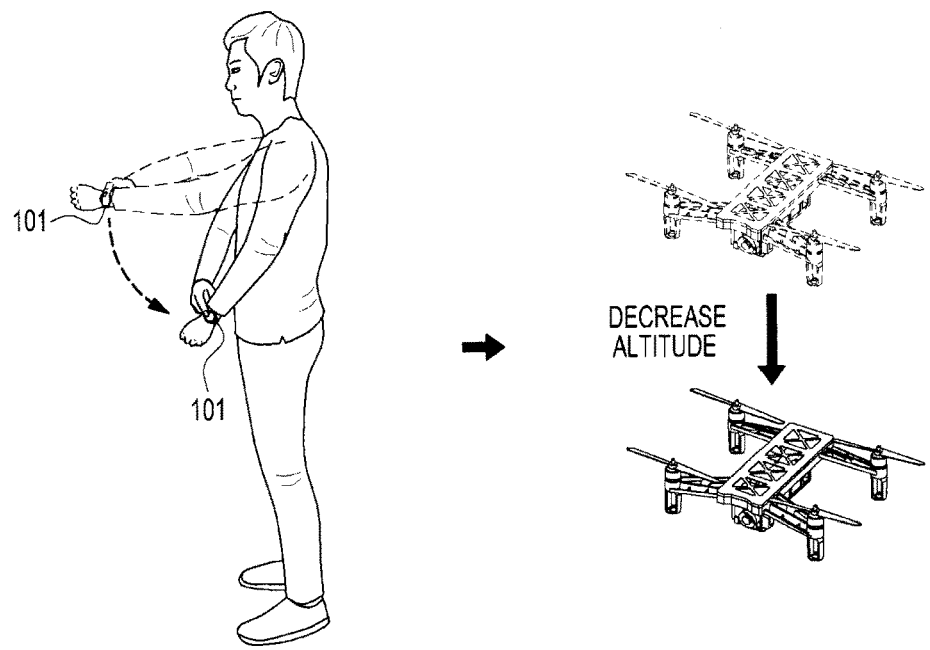

First, when the user raises the wrist wearing the electronic device 101 upward while maintaining a touch input through an area other than the central area 1300 from which the touch input is started as illustrated in FIG. 14A, the electronic device 101 may generate control signals or select a command from the command set to control the UAV 800 to fly upward, so that the altitude of the UAV 800 is increased. On the contrary, as illustrated in FIG. 14B, when the user lowers the wrist downward while maintaining the touch input through the screen of the electronic device 101, the electronic device 101 generate control signals or select a command from the command set to control the UAV 800 to fly downward, so that the altitude of the UAV 800 is decreased. As described above, the user may control the altitude of the UAV 800 through an intuitive act of raising or lowering the wrist, thus enabling an intuitive control. Here, when the user raises or lowers the wrist while maintaining the touch input with one finger and rotating the wheel dial member 430 with other fingers, the electronic device 101 may generate control signals or select a command from the command set to perform throttle and yaw controls of the UAV 800 at the same time.

Although it has been described above that the throttle control of the UAV 800 is performed using the wheel dial member 430 and a phase change of the electronic device 101, for example, by raising or lowering the wrist, a method of controlling the UAV 800 may not be limited thereto.

The control method is described below with reference to a flight control screen illustrated in FIG. 13B.

Figure 13B:
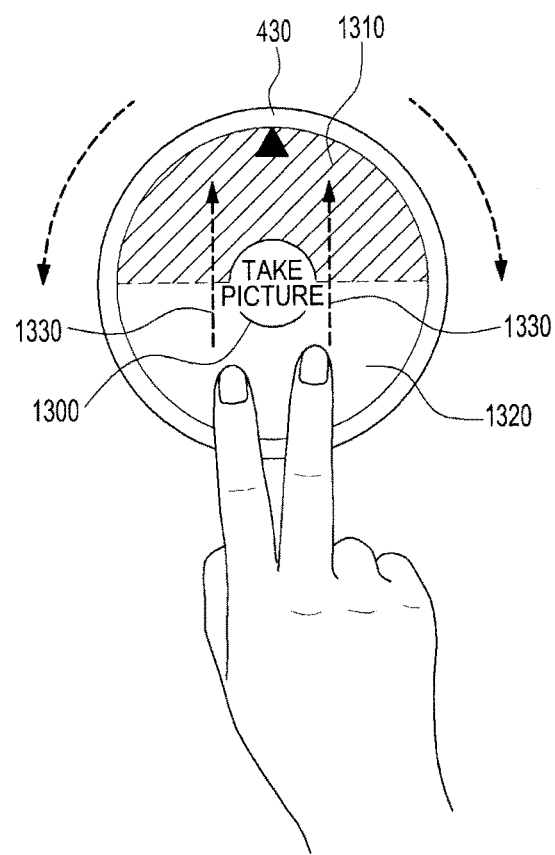

Referring to FIG. 13B, the electronic device 101 may be configured to generate a control signal or select a command from the command set to control the flight of the UAV 800 in the upward and downward directions corresponding to the user's multi-touch and drag input 1330 from one area to another area. For example, when the user inputs a multi-touch and drag from the upper area to the lower area, the electronic device 101 may generate control signals or select a command from the command set to perform a control of decreasing the altitude of the UAV 800. Although FIG. 13B illustrates the divided upper and lower areas 1310 and 1320 of the touch screen, up and down may be distinguished only by the direction of the multi-touch and drag, and thus such divided areas may not be illustrated.

Further, as illustrated in FIG. 13B, the user may input a multi-touch and drag, simultaneously with rotating the wheel dial member 430. In this case, the electronic device 101 may perform generate control signals or select a command from the command set to a throttle control and a yaw control at the same time. Thus, the UAV 800 may be rotated, simultaneously with flying upward or downward in the direction of the touch and drag. As described above, the electronic device 101 may generate control signals or select a command from the command set to generate a control signal to control a flight in one direction of the roll and pitch directions of the UAV corresponding to a touch input through the central area 1300 of the areas 1310 and 1320. Although it has been described above that a roll or pitch control is performed corresponding to the direction of the touch and drag from one area to another area, a roll or pitch control may be performed using a button disposed at the center.

A process of controlling the UAV according to a touch input via the button disposed at the center is described with reference to FIG. 15A to 16B. FIG. 15A to FIG. 16B illustrate screens of the electronic device 101 changing according to a touch input to control the UAV according to another embodiment of the present disclosure.

Figure 15A:
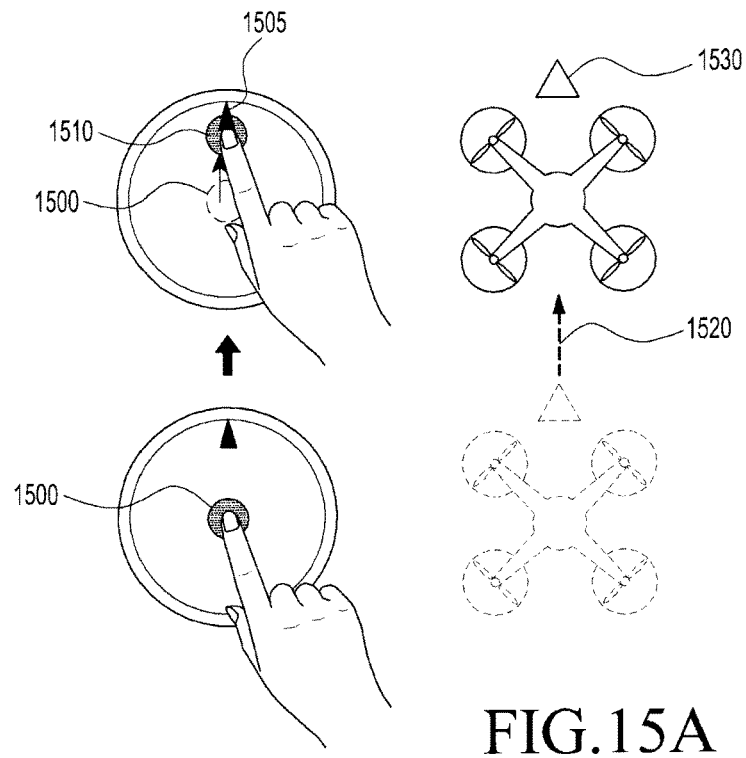
FIG. 15A to FIG. 16B illustrate screens of an electronic device changing according to a touch input to control an unmanned aerial vehicle according to another embodiment of the present disclosure.
Figure 15B:
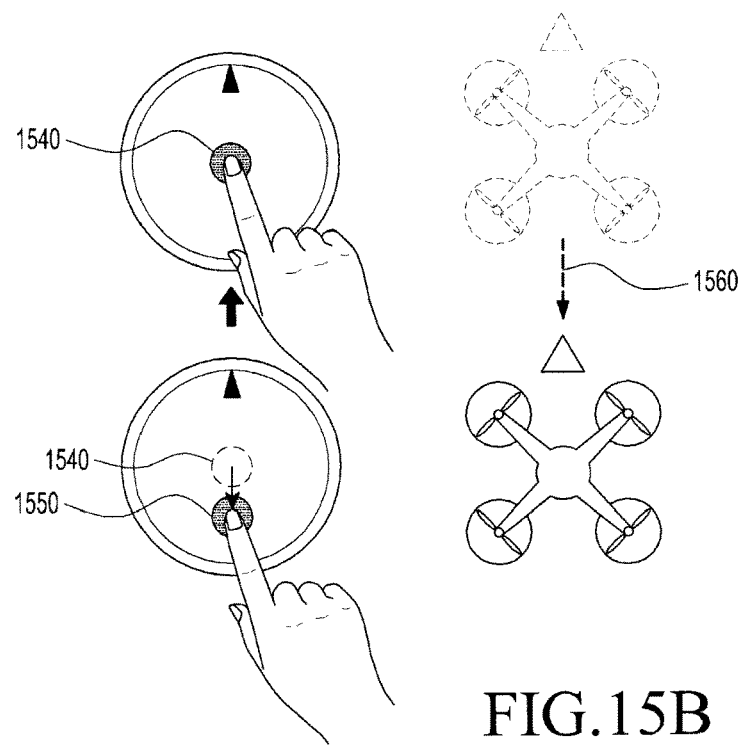
Figure 16A:
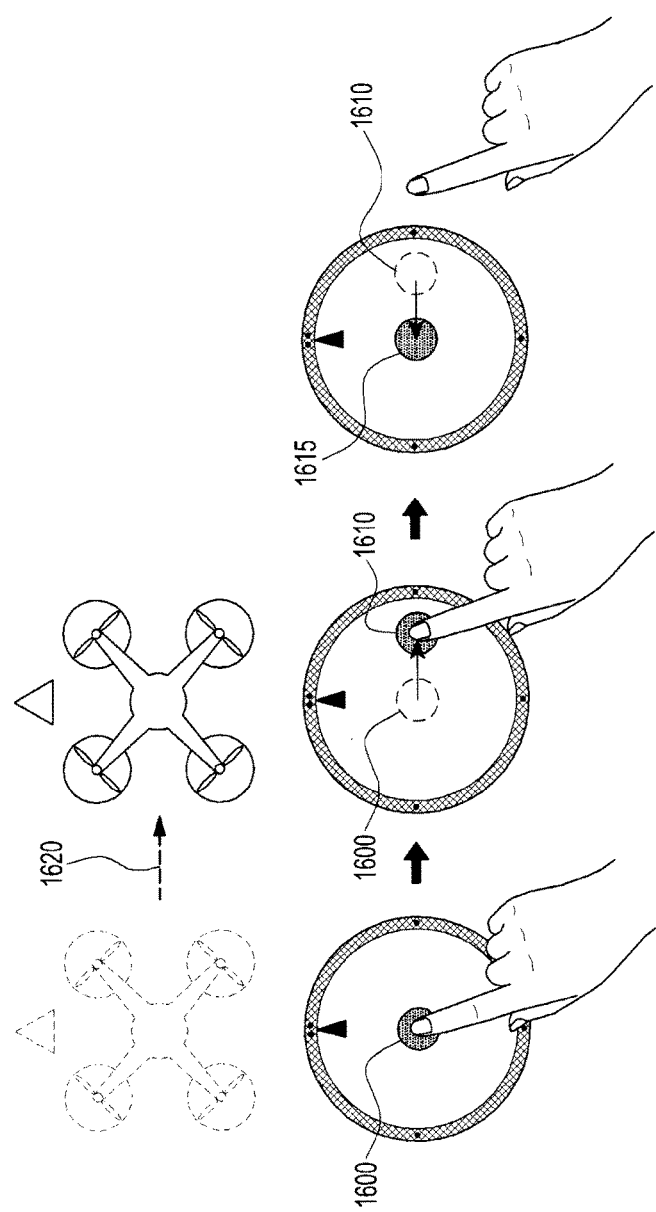
Figure 16B:
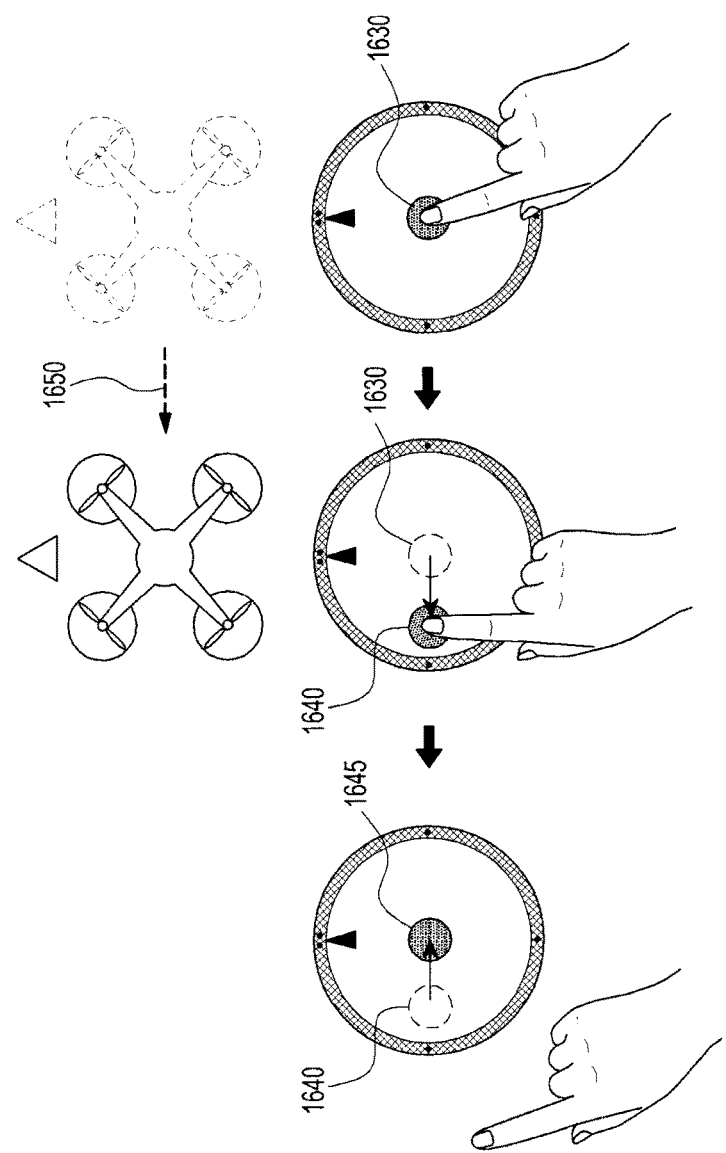

As illustrated in FIG. 15A, when the user performs a touch and upward drag 1510 of a controller button 1500 on the screen, the controller button 1500 is also moved upward 1510 to be displayed on the screen, and accordingly the electronic device 101 generates control signals or selects a command from the command set to cause the UAV 800 to also move forward 1520. Here, head direction information 1505 on the UAV 800 displayed on the screen of the electronic device 101 indicates the current head direction 1530 of the UAV 800. On the contrary, when the user performs a touch and downward drag 1550 of a controller button 1540 on the screen, the controller button 1540 is also moved downward 1550 to be displayed on the screen, and accordingly the electronic device 101 generates control signals or selects a command from the command set to cause the UAV 800 to also move backward 1560. Here, a pitch value ranging from −180 to 180 is transmitted, in which the absolute value of the pitch value becomes greater with a longer distance from a starting point, and the UAV 800 moves at a higher speed with the greater absolute value. Such direction information synchronization may be performed when the direction of the electronic device 101 is changed or the direction of the UAV 800 is changed. The direction information synchronization will be described below in detail. Further, as illustrated in FIG. 16A, when the user performs a touch and rightward drag 1610 of a controller button 1600 on the screen, the UAV 800 also moves rightward 1620. To stop the moving UAV 800, the user releases the touch of the controller button 1600. Here, when the user drags 1610 the controller button rightward from a starting point 1600 and removes the finger, the controller button may return to the starting point 1615.

On the contrary, when the user performs a touch and leftward drag 1640 of a controller button 1630 on the screen, the electronic device 101 generates control signals or selects a command from the command set to cause the UAV 800 to move leftward 1650. Likewise, to stop the moving UAV 800, the user releases the touch of the controller button 1630. Here, when the user drags 1640 the controller button leftward from a starting point 1630 and removes the finger, the controller button may return to the starting point 1645.

Meanwhile, an event of a touch and drag from one area to another area or an event of a touch and drag of a controller button occurs, the electronic device 101 may calculate coordinates of the track of a drag based on the x and y coordinates of a touch through the touch panel of the touch screen. The electronic device 101 may convert changing coordinate values of a touch and drag into an integer ranging from −180 to 180 and calculates an integer for a roll or pitch control accordingly. The electronic device 101 generates a control instruction or selects a command from a command set, includes the integer and transmits the control instruction or command from the command set with the integer to the UAV 800, thereby moving the UAV 800.

Figure 17:
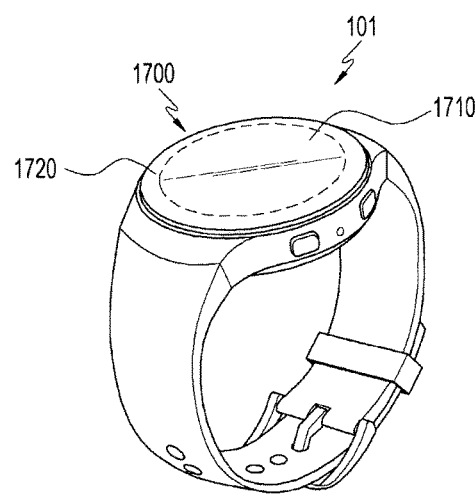
FIG. 17 schematically illustrates a watch-type electronic device according to various embodiments of the present disclosure.

FIG. 17 schematically illustrates a watch-type electronic device according to various embodiments of the present disclosure.

Referring to FIG. 17, a touch screen 1710 may be disposed on a front surface of a main body 1700 of the watch-type electronic device 101, and a user interface may be provided in a bezel area 1720 of the touch screen 1710. Here, the bezel area 1720 may be formed to surround the circumference of the touch screen 1710 and may have a doughnut shape. In addition, the bezel area 1720 may have various shapes including an oval shape. The bezel area 1720 according to various embodiments of the present disclosure is shown as having a circular doughnut shape to surround the circumference of the touch screen 1710, but may also be provided as a user interface with various shapes corresponding to a rotational manipulation of the wheel dial member 430.

FIG. 18 illustrates a ring-type screen of an electronic device to control a UAV according to various embodiments of the present disclosure.

Figures 18A, 18B:
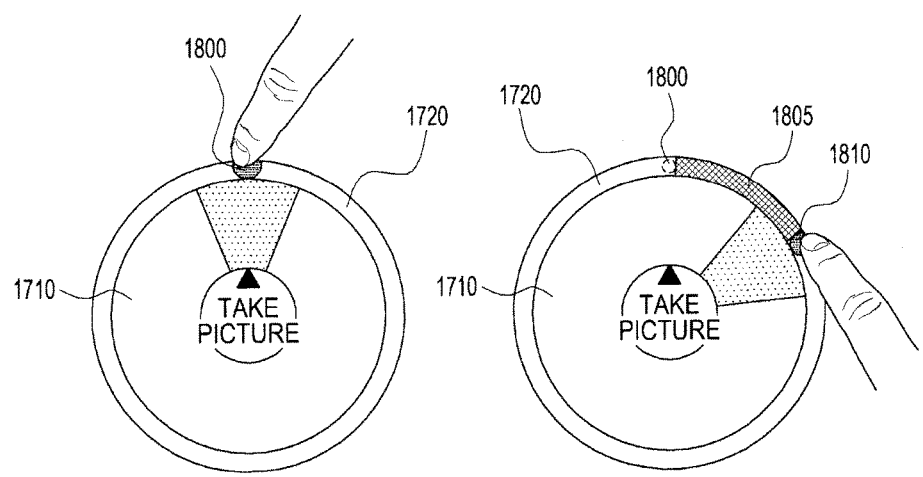
FIG. 18A and FIG. 18B illustrate a ring-type screen of an electronic device to control an unmanned aerial vehicle according to various embodiments of the present disclosure.

As illustrated in FIG. 18A, a touch screen 1710 may display direction information indicating the head direction of the UAV 800 along with a bezel area 1720. The user may touch a first spot 1800 corresponding to the current head direction of the UAV 800 and may drag the finger to a second spot 1810 (FIG. 18B) corresponding to a direction to rotate the UAV 800. In this case, an area 1805 corresponding to a rotational track of the touch and drag may be displayed.

Figure 19:
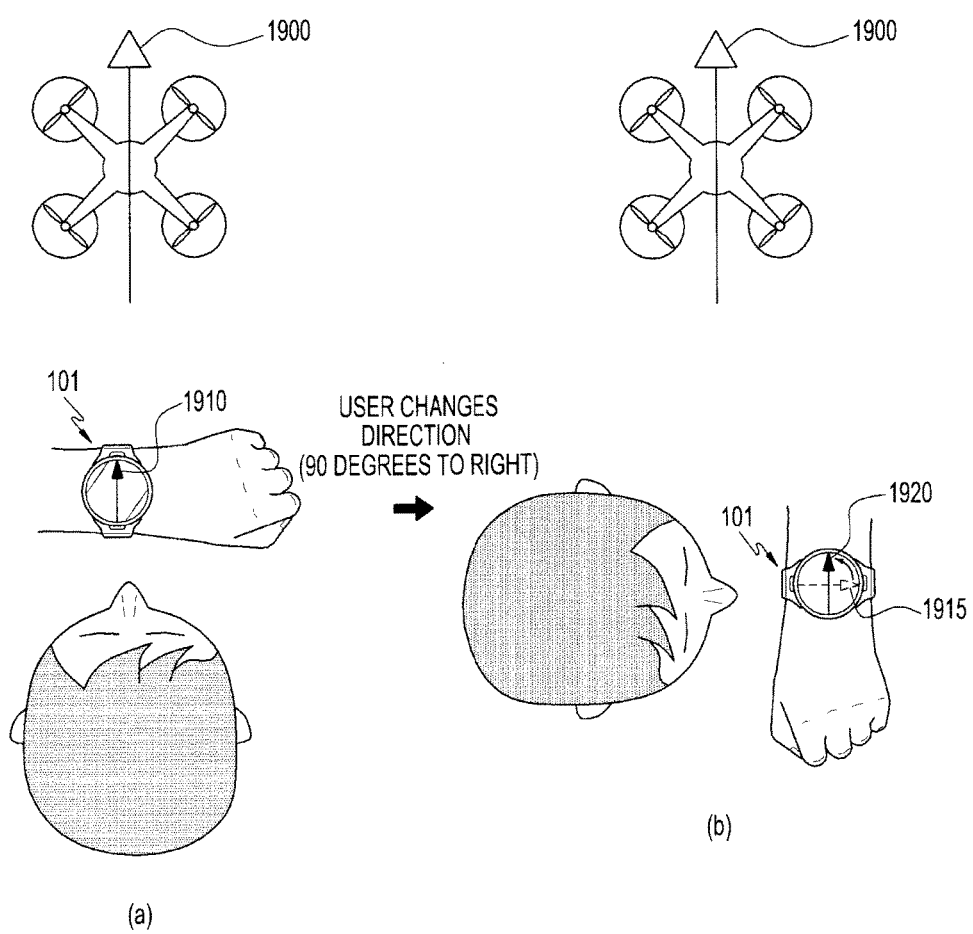
FIGS. 19 (a) and (b) illustrate direction information synchronization with respect to an unmanned aerial vehicle according to various embodiments of the present disclosure.

FIG. 19 illustrates direction information synchronization with respect to a UAV according to various embodiments of the present disclosure.

As illustrated in FIG. 19(a), head direction information 1910 corresponding to the head direction 1900 of the UAV 800 may be displayed in real time on the electronic device 101 through direction information synchronization. Here, as illustrated in FIG. 19(b), when the user turns, for example, 90 degrees to the right, the electronic device 101 may be configured to display head direction information 1920 synchronized with a direction corresponding to the actual head direction of the UAV 800, instead of head direction information 1915 based on the direction of the user's gaze.

Specifically, when the user turns 90 degrees to the right, the direction of the electronic device 101 worn on the wrist is changed. In this case, direction information synchronization may be performed to always display the direction information 1920 corresponding to the head direction 1900 of the UAV 800, as in a compass, so that the user may identify the direction of the UAV 800 in real time although the direction of the electronic device 101 is changed. For example, with flight information that indicates the head direction of the UAV 800 being displayed on the screen of the electronic device 101, when the rotation angle of the electronic device 101 detected by the sensor unit exceeds a threshold, the electronic device 101 may change the flight information corresponding to the head direction of the UAV to display the flight information. That is, defining a reference line corresponding to the head direction as a reference line for a roll and a line vertical to the head direction as a reference line for a pitch, when a touch event occurs with the head direction changed, the electronic device 101 may calculate roll and pitch control values based on the corresponding reference lines.

Accordingly, when the user stretches the arm with the electronic device 101 worn on the wrist and folds the arm toward the user, the user may directly identify a direction in which the UAV 800 points only through the screen displaying the actual head direction of the UAV 800, regardless of the user's gaze at the electronic device 101. When the head direction information 1920 displayed on the electronic device 101 is changed to a direction corresponding to the head direction of the UAV 1900, criteria for a roll and a pitch may also be changed, thus enabling an easy control in the user's desired direction.

The term "module" as used herein may include a unit consisting of hardware, or hardware with memory storing executable instructions, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code which is made by a compiler or a code which may be executed by an interpreter.

The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

According to various embodiments, a storage medium stores instructions, wherein the instructions are set for at least one processor to perform at least one operation when executed by the at least one processor, and the at least one operation may include: displaying information associated with a movement of an unmanned aerial vehicle; generating a control signal to control the movement of the unmanned aerial vehicle based on an input through at least one of a user interface, which is disposed to be rotatable around a display of an electronic device displaying the information and is configured to perform detecting an input to move the unmanned aerial vehicle, and the display; and transmitting the control signal to the unmanned aerial vehicle.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. A wearable device for controlling a movement of an unmanned aerial vehicle, the wearable device comprising:
    a display;
    a user interface comprising a ring structure that is rotatable on the display;
    communication circuitry; and
    at least one processor configured to:
        control the display to display information associated with the movement of the unmanned aerial vehicle;
        provide a control signal to control the movement of the unmanned aerial vehicle based on a rotation of the ring structure; and
        control the communication circuitry to transmit the control signal to the unmanned aerial vehicle.

2. The wearable device of claim 1, wherein the at least one processor is configured to detect an input based on at least one of an amount of the rotation of the ring structure and the display, and provide the control signal to control the movement of the unmanned aerial vehicle based on the detected input.

3. The wearable device of claim 1, further comprising sensor circuitry that detects an orientation of the wearable device with a first reference surface, wherein the orientation comprises a horizontal state in which the wearable device is substantially parallel with the first reference surface, and a vertical state in which the wearable device is substantially orthogonal to the first reference surface, and a movement of the wearable device.

4. The wearable device of claim 3, wherein the at least one processor provides a control signal to adjust a rotation of the unmanned aerial vehicle based on the rotation of the ring structure, when the orientation is the horizontal state.

5. The wearable device of claim 3, wherein the at least one processor provides a control signal to adjust an upward-and-downward flight of the unmanned aerial vehicle based on the rotation of the ring structure, when the orientation is the vertical state.

6. The wearable device of claim 3, wherein the at least one processor calculates a movement change rate of the wearable device based on at least one of a movement direction and a movement angle of the wearable device, which are detected by the sensor circuitry, and provides a control signal to adjust a flight of the unmanned aerial vehicle in one direction of roll and pitch directions corresponding to the calculated movement change rate and the movement direction.

7. The wearable device of claim 3, wherein when a movement direction of the wearable device detected by the sensor circuitry is a vertical direction, with a touch input through the display being maintained, the at least one processor provides a control signal to adjust an upward-and-downward flight of the unmanned aerial vehicle corresponding to a vertical movement.

8. The wearable device of claim 1, wherein the at least one processor provides a control signal to adjust an upward-and-downward flight of the unmanned aerial vehicle corresponding to a multi-touch and drag from one of divided upper and lower areas of the display to another area, and provides a control signal to adjust a flight of the unmanned aerial vehicle in one direction of roll and pitch directions corresponding to a touch input through a central area of the areas.

9. The wearable device of claim 3, wherein when a rotation angle of the wearable device detected by the sensor circuitry exceeds a threshold value, with flight information that indicates a head direction of the unmanned aerial vehicle being displayed on the display, the at least one processor controls the display to display the flight information, which is changed corresponding to the head direction of the unmanned aerial vehicle.

10. The wearable device of claim 1, further comprising:
    a main body that comprises a substantially front surface on which the display and the user interface are disposed and a rear surface that is in contact with a body part of a user wearing the wearable device; and
    a band that is connected to opposite ends of the main body to fix the wearable device to the body part of the user.

11. A non-transitory storage medium of a wearable device that stores instructions, wherein the instructions are set for at least one processor to perform at least one operation when executed by the at least one processor, the at least one operation comprising:
- displaying information associated with a movement of an unmanned aerial vehicle on a display of the wearable device;
- detecting a rotation of a ring structure that is rotatable on the display;
- providing a control signal to control the movement of the unmanned aerial vehicle based on the rotation of the ring structure; and
- transmitting the control signal to the unmanned aerial vehicle.

12. The storage medium of claim 11, wherein the detecting of the rotation of the ring structure comprises detecting an input based on at least one of the display and an amount of the rotation of the ring structure that is formed along a circumference of the display and is physically rotatable.

13. The storage medium of claim 11, wherein the providing of the control signal to control the movement of the unmanned aerial vehicle comprises providing a control signal to adjust a rotation of the unmanned aerial vehicle corresponding to the rotation of the ring structure when it is detected that the wearable device is in a horizontal state of being substantially parallel with a first reference surface.

14. The storage medium of claim 11, wherein the providing of the control signal to control the movement of the unmanned aerial vehicle comprises providing a control signal to adjust an upward-and-downward flight of the unmanned aerial vehicle corresponding to the rotation of the ring structure when it is detected that the wearable device is substantially orthogonal to a first reference surface.

15. The storage medium of claim 11, wherein the at least one operation further comprises:
- calculating a movement change rate of the wearable device based on at least one of a movement direction and a movement angle of the wearable device; and
- providing a control signal to adjust a flight of the unmanned aerial vehicle in one direction of roll and pitch directions corresponding to the calculated movement change rate and the movement direction.

16. The storage medium of claim 11, wherein the at least one operation further comprises:
- detecting a movement direction of the wearable device, with a touch input through the display being maintained; and
- providing a control signal to adjust an upward-and-downward flight of the unmanned aerial vehicle corresponding to a vertical movement when the movement direction of the wearable device is a vertical direction.

17. The storage medium of claim 11, wherein the at least one operation further comprises:
- providing a control signal to adjust an upward-and-downward flight of the unmanned aerial vehicle corresponding to a multi-touch and drag from one of divided upper and lower areas of the display to another area; and
- providing a control signal to adjust a flight of the unmanned aerial vehicle in one direction of roll and pitch directions corresponding to a touch input through a central area of the areas.

18. The storage medium of claim 11, wherein when a rotation angle of the wearable device exceeds a threshold value, with flight information that indicates a head direction of the unmanned aerial vehicle being displayed on the display, the at least one operation further comprises displaying the flight information, which is changed corresponding to the head direction of the unmanned aerial vehicle.

19. A method of controlling a movement of an unmanned aerial vehicle by an wearable device, the method comprising:
- displaying information associated with the movement of the unmanned aerial vehicle on a display of the wearable device;
- detecting a rotation of a ring structure that is rotatable on the display;
- providing a control signal to control the movement of the unmanned aerial vehicle based on the rotation of the ring structure; and
- transmitting the control signal to the unmanned aerial vehicle.

20. The method of claim 19, wherein the providing of the control signal to control the movement of the unmanned aerial vehicle comprises detecting an input based on at least one of an amount of the rotation of the ring structure and the display and providing the control signal to control the movement of the unmanned aerial vehicle based on the detected input.

* * * * *